United States Patent
Wilcoxson et al.

(10) Patent No.: US 10,807,737 B2
(45) Date of Patent: Oct. 20, 2020

(54) PROCESS FOR HANDLING, INSTALLING, COMPACTING, SPLICING, AND/OR ASSEMBLING COMPOSITE STRINGERS

(71) Applicant: The Boeing Company, Chicago, IL (US)

(72) Inventors: Paul Chace Wilcoxson, Maple Valley, WA (US); Samuel Ray Stewart, Redmond, WA (US); Kurtis Shuldberg Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 15/840,119

(22) Filed: Dec. 13, 2017

(65) Prior Publication Data

US 2018/0111672 A1 Apr. 26, 2018

Related U.S. Application Data

(62) Division of application No. 14/488,071, filed on Sep. 16, 2014, now Pat. No. 9,873,500.

(51) Int. Cl.

| | |
|---|---|
| *B64F 5/10* | (2017.01) |
| *B29C 70/44* | (2006.01) |
| *B29C 31/08* | (2006.01) |
| *B29C 33/30* | (2006.01) |
| *B29D 99/00* | (2010.01) |

(Continued)

(52) U.S. Cl.
CPC ............. *B64F 5/10* (2017.01); *B29C 31/085* (2013.01); *B29C 33/306* (2013.01);
(Continued)

(58) Field of Classification Search
CPC ... B64C 1/064; B64C 2001/0072; B64F 5/10; B29C 70/446; B29C 31/085;
(Continued)

(56) References Cited

U.S. PATENT DOCUMENTS 4,980,013 A 12/1990 Lowery
6,017,484 A 1/2000 Hale
(Continued)

FOREIGN PATENT DOCUMENTS

EP 2133263 12/2009
WO 2013/153537 10/2013

OTHER PUBLICATIONS

European Patent Office, Extended European Search Report for related European patent application EP 15183016.3, dated Feb. 12, 2016.

*Primary Examiner* — John L Goff, II
(74) *Attorney, Agent, or Firm* — Dascenzo Intellectual Property Law, P.C.

(57) ABSTRACT

Methods of assembling stiffened composite structures are disclosed. Some methods include forming a stiffener assembly by compacting it within a trough formed in a trunnion. A single trunnion may accommodate two or more different types of stiffeners, thereby avoiding the need for multiple sets of tooling. In some methods, a plurality of stiffener segments may be spliced together, thereby avoiding the need to transport and handle an entire stiffener. A vacuum chuck may be utilized in some examples to transfer the stiffener assembly from the trunnion to a transfer tool. The same vacuum chuck may be transferred along with the stiffener assembly on the transfer tool and loaded onto an inner mold line layup mandrel, where the vacuum chuck may be used to compact the stiffener assembly to the inner mold line layup mandrel.

20 Claims, 19 Drawing Sheets

(51) Int. Cl.
*B64C 1/06* (2006.01)
*B29L 31/30* (2006.01)
*B64C 1/00* (2006.01)

(52) U.S. Cl.
CPC ........ *B29C 70/446* (2013.01); *B29D 99/0003* (2013.01); *B29D 99/0014* (2013.01); *B64C 1/064* (2013.01); *B29L 2031/3076* (2013.01); *B29L 2031/3082* (2013.01); *B29L 2031/3085* (2013.01); *B64C 2001/0072* (2013.01); *Y02T 50/43* (2013.01)

(58) Field of Classification Search
CPC .............. B29C 33/306; B29C 65/7847; B29D 99/0003; B29D 99/0014; Y02T 50/43; B29L 2031/3076; B29L 2031/3082; B29L 2031/3085
See application file for complete search history.

(56) References Cited

U.S. PATENT DOCUMENTS

| | | |
|---|---|---|
| 7,459,048 B2 | 2/2008 | Pham et al. |
| 7,597,772 B2 | 10/2009 | Martinez Cerezo et al. |
| 9,199,417 B1 | 12/2015 | Rotter et al. |
| 9,221,235 B1 | 12/2015 | Rotter et al. |
| 9,221,236 B1 | 12/2015 | Rotter et al. |
| 9,272,495 B1 | 3/2016 | Robins et al. |
| 2006/0231981 A1 | 10/2006 | Lee et al. |
| 2009/0320292 A1 | 12/2009 | Brennan et al. |
| 2010/0102482 A1 | 4/2010 | Jones et al. |
| 2010/0151162 A1 | 6/2010 | Dorawa et al. |
| 2010/0196637 A1 | 8/2010 | Lippert et al. |
| 2010/0239865 A1 | 9/2010 | Kallinen |
| 2012/0076989 A1 | 3/2012 | Bland |
| 2013/0036922 A1 | 2/2013 | Stewart et al. |
| 2013/0174396 A1 | 7/2013 | Tones Martinez |

PROCESS FOR HANDLING, INSTALLING, COMPACTING, SPLICING, AND/OR ASSEMBLING COMPOSITE STRINGERS

RELATED APPLICATIONS

This application is a divisional of and claims priority under 35 U.S.C. § 120 to U.S. patent application Ser. No. 14/488,071, now U.S. Pat. No. 9,873,500, which is entitled "PROCESS AND APPARATUS FOR HANDLING, INSTALLING, COMPACTING, SPLICING, AND/OR ASSEMBLING COMPOSITE STRINGERS," which was filed on Sep. 16, 2014, the disclosure of which is hereby incorporated by reference.

FIELD

The present disclosure relates to the assembly of composite stringers for stiffened composite structures.

BACKGROUND

Stiffened composite structures are structures that are constructed of composite materials, such as fiber-reinforced composite materials, and typically include some form of structural frame that carries a skin. Some modern aircraft fuselages are examples of stiffened composite structures that include a skin operatively coupled to frame members that extend circumferentially around and that are spaced longitudinally along the inside of the fuselage and stringers that extend longitudinally along and that are spaced circumferentially around the inside of the fuselage. Typically, stiffened composite fuselages are constructed utilizing an inner mold line layup mandrel that includes stringer cavities, or forms, that extend longitudinally along the mandrel. Working from the top of the inner mold line layup mandrel, stringers are hand positioned in the stringer cavities.

Typical stringers, such as hat-shaped stringers, define cavities themselves, with these cavities needing to be filled with a structure that will result in a flush surface to which the skin may be applied. These filler structures often are referred to as stringer bladders, or simply bladders. In addition to the bladders, radius fillers, or noodles, are used at the interfaces between the outer most edges of the bladders and the stringers to ensure a smooth transition between the stringers and the skin, once it is applied (e.g., to ensure a smoother surface between the stringer and bladder, so that the skin isn't stressed by sharp transitions at the interface of the bladder and stringer). Following their placement, the bladders and noodles are vacuum-compacted in batches so that the bladders and noodles remain in place for subsequent application of the skin.

The vacuum compacting process utilizes a gas-impermeable flexible sheet of material that extends across the outer surface of the inner mold line layup mandrel and that is sealed to the inner mold line layup mandrel around the outer perimeter of the stringers and associated bladders and noodles that are being compacted. A vacuum is then applied between the sheet of material and the inner mold line layup mandrel to compress the bladders into the stringers. This process is referred to in the aerospace industry as "bagging."

U.S. patent application Ser. No. 13/733,036, filed on Jan. 2, 2013 and entitled "SYSTEMS AND METHOD FOR ASSEMBLING STIFFENED COMPOSITE STRUCTURES," U.S. patent application Ser. No. 14/012,911 filed Aug. 28, 2013 and entitled SYSTEMS AND METHODS FOR ASSEMBLING STIFFENED COMPOSITE STRUCTURES, and U.S. patent application Ser. No. 13/732,961 filed Jan. 2, 2013 and entitled SYSTEMS AND METHODS FOR ASSEMBLING STIFFENED COMPOSITE STRUCTURES disclose related systems and methods of assembling stiffened composite structures, and the complete disclosures of these applications are hereby incorporated by reference in their entirety for all purposes. As described in these applications, a stringer is often loaded onto the mold line layup mandrel first, often by hand, and a separate tool or step may be utilized to install the filler structure and radius fillers within the stringer cavity.

The loading of the stringers and the installation of the bladders and noodles, as well as the bagging process and the compacting process, are performed on the upper side of the inner mold line layup mandrel, which, for a fuselage of a commercial aircraft, can be very large. Stringers may be very long (greater than 20 feet long), and may be difficult to handle and move in their entirety. Moreover, these processes are all labor and time intensive. Further, often times a fuselage section may include two or more different types of stringers, where each type of stringer requires its own customized tooling. Such tooling is also very large, which may require excessive space for use and storage.

SUMMARY

Improved systems and methods for assembling stiffened composite structures are disclosed herein. Disclosed systems and methods generally may provide for positioning of a stiffener such as a stringer, a filler structure, and one or more radius fillers all together, using a trunnion and a transfer tool, onto an inner mold line layup mandrel. In some examples, the stringer or stringer segments may be pre-formed. Such systems and methods may improve efficiency on the production line in some examples. Disclosed systems and methods also may include splicing together two or more stringer segments, so that the stringer may be handled and transported in segments, rather than in its entire length. Further, disclosed systems and methods may be configured to accommodate two or more different types (e.g., sizes) of stringers, such that a single trunnion may be used to make a plurality of types of stringers to be layed up on an inner mold line layup mandrel during manufacture of a given composite structure.

A method of assembling a stiffened composite structure according to the present disclosure may include indexing a stiffener defining a stiffener cavity to a trunnion. The trunnion may include an elongated rotatable chuck having a plurality of sides extending between a forward end and an aft end. The elongated rotatable chuck may be configured to rotate about its longitudinal axis and also may include a plurality of stiffener trays, where each stiffener tray may be secured to a respective one of the plurality of sides. Each stiffener tray may have a respective trough formed therein, and each of the troughs may be configured to receive a stiffener. The trunnion also may include a first support structure positioned adjacent the forward end, a second support structure positioned adjacent the aft end, and a mechanism configured to raise and lower the elongated rotatable chuck with respect to the first support structure and the second support structure.

The method may further include loading a filler structure within the stiffener cavity and a radius filler along the length of the filler structure, thereby forming a stiffener assembly, applying a vacuum chuck to the trunnion to compact the stiffener assembly, moving the vacuum chuck together with the stiffener assembly from the trunnion to a transfer tool, moving the transfer tool from a first position adjacent the trunnion to a second position adjacent an inner mold line layup mandrel, and loading the vacuum chuck together with the stiffener assembly onto the inner mold line layup mandrel. Method steps may be repeated a plurality of times so that a plurality of stringer assemblies are compacted onto the inner mold line layup mandrel. Skin segments may be affixed around the stringer assemblies and cured in order to form a stiffened composite structure. A plurality of stiffened composite structures may be formed and assembled together in some methods.

Systems for assembling stiffened composite structures also are disclosed. For example, such systems may include a trunnion, an inner mold line layup mandrel, a vacuum chuck configured to compact a stiffener assembly comprising a stiffener, a filler structure, and a radius filler onto the trunnion, and a transfer tool configured to receive the vacuum chuck and the stiffener assembly together from the trunnion and transfer the vacuum chuck and stiffener assembly together to the inner mold line layup mandrel. The trunnion may comprise an elongated rotatable chuck having a plurality of sides extending between a forward end and an aft end, and a plurality of stiffener trays, each stiffener tray being secured to a respective one of the plurality of sides, each stiffener tray having a respective trough formed therein. The elongated rotatable chuck may be configured to rotate about its longitudinal axis. Each of the troughs may be configured to receive a stiffener. The trunnion also may include a first support structure positioned adjacent the forward end, a second support structure positioned adjacent the aft end, and a mechanism configured to raise and lower the elongated rotatable chuck with respect to the first support structure and the second support structure.

DESCRIPTION

Figure 1:
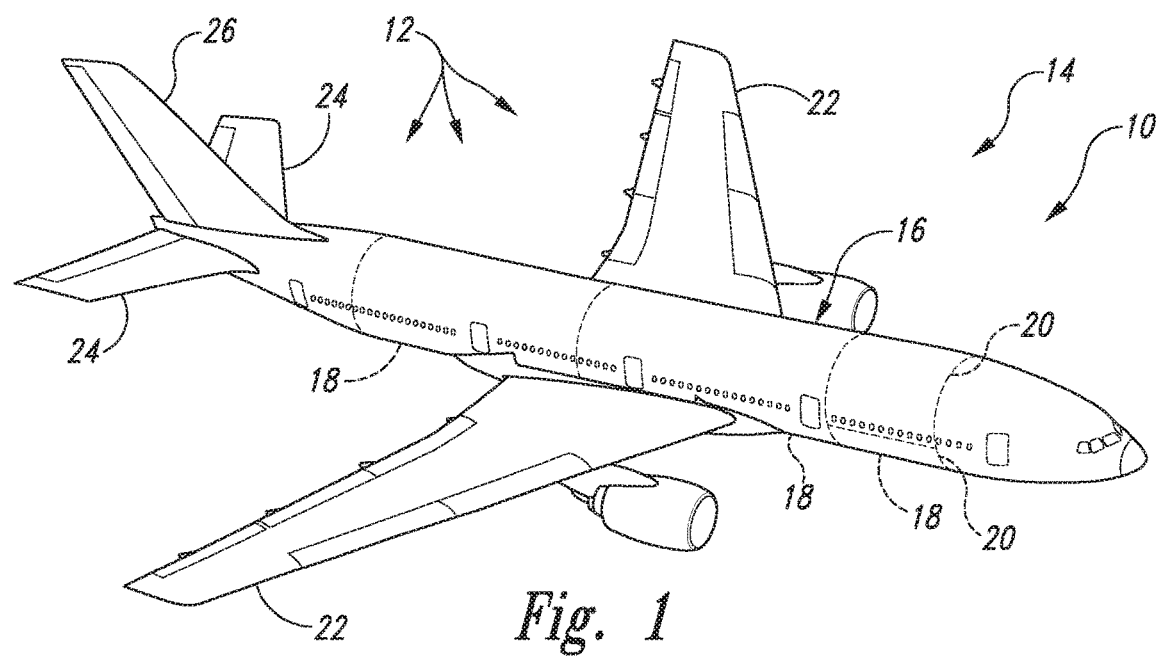
FIG. 1 is a perspective view of an illustrative, non-exclusive example of a stiffened composite structure in the form of an aircraft.

Methods and systems for assembling stiffened composite structures, as well as stiffened composite structures themselves and apparatuses constructed of stiffened composite structures, are disclosed herein. In FIG. 1, an example of an apparatus 10 that may be constructed from stiffened composite structures 12 is provided in the form of an aircraft 14; however, other apparatuses 10 are within the scope of the present disclosure, and the present disclosure is not limited to aircraft and aircraft applications. For example, as illustrative, non-exclusive examples, other apparatuses 10 that may be constructed of stiffened composite structures 12 include (but are not limited to) spacecraft, watercraft, land vehicles, wind turbines, structural towers and masts, etc. Moreover, aircraft 14 may take any suitable form, including commercial aircraft, military aircraft, private aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) helicopters.

Aircraft 14 may include a fuselage 16, which generally corresponds to the main body of aircraft 14 for holding passengers, crew, cargo, and/or equipment, for example, depending on the particular configuration and/or function of an aircraft 14. Typically, although not required, the fuselage 16 of an aircraft 14 is elongate and somewhat cylindrical or tubular. In some embodiments, the fuselage 16 may be constructed of multiple sections 18 that are longitudinally spaced along the fuselage 16 and operatively coupled together to define the fuselage 16. As used herein when referencing an aircraft 14, a fuselage 16, and/or a corresponding stiffened composite structure 12, the longitudinal direction refers to the fore-aft direction, corresponding to a longitudinal, or long, axis, of the fuselage 16. Additionally, the terms "inner" and "outer" when used in connection with an aircraft 14, a fuselage 16, and/or a corresponding stiffened composite structure 12 refer to the radially inward side and the radially outward side, respectively, of the corresponding stiffened composite structure. Accordingly, the outer side of a fuselage 16 or a component part thereof generally faces away from the fuselage 16, and the inner side of a fuselage 16 or a component part thereof generally faces the internal volume that is defined by the fuselage 16. Similar relative terms may be used with respect to stiffened composite structures 12 other than fuselages 16 and with respect to apparatuses 10 other than aircraft 14.

In FIG. 1, three fuselage sections 18 are indicated schematically; however, any number or size and shape of sections 18 may be used to construct a fuselage 16. Sections 18 additionally or alternatively may be referred to as barrel sections 18 of a fuselage 16, with each barrel section 18 generally defining a length of the fuselage 16. Additionally or alternatively, as schematically illustrated in FIG. 1, a section 18 may include, or be constructed of, more than one subsection 20. In the schematically illustrated and optional example of FIG. 1, a section 18 is shown schematically and optionally to include an upper subsection 20 and a lower subsection 20; however, a section 18 may be constructed of any suitable number, configuration, and placement of subsections 20, including no subsections 20 at all.

Aircraft 14 also may include wings 22, horizontal stabilizers 24, and a vertical stabilizer 26, each of which may be constructed as a unitary structure or in subsections that are subsequently assembled together. One or more of a fuselage 16, a fuselage section 18, a fuselage subsection 20, a wing 22, a horizontal stabilizer 24, a vertical stabilizer 26, or a structural subsection thereof may be constructed of and/or may be described as a stiffened composite structure 12 according to the present disclosure.

Figure 2:
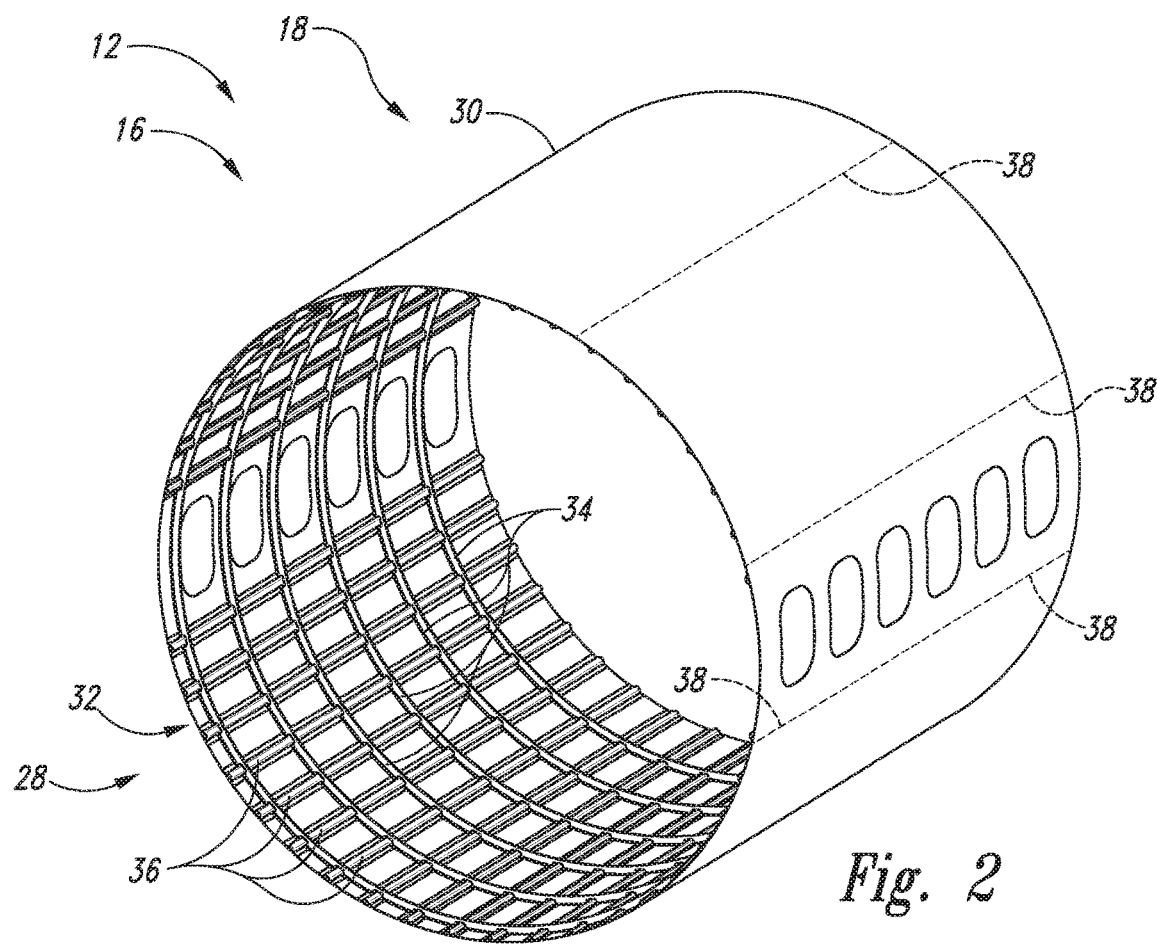
FIG. 2 is an isometric view of an illustrative, non-exclusive example of a stiffened composite structure in the form of a barrel section of an aircraft.

Stiffened composite structures 12 according to the present disclosure generally encompass structures that are defined by a structural frame 28 and a skin 30 (as illustrated in FIG. 2) that is operatively coupled to and supported by the structural frame 28. FIG. 2 depicts an illustrative, non-exclusive example of a stiffened composite structure 12 in the form of a barrel section 18 of a fuselage 16 of an aircraft 14. The skin 30 may be described as defining the outer shape of the fuselage 16. As indicated in FIG. 2, structural frames 28 include a plurality of stiffeners 32 operatively coupled to the inner side of the skin 30. In the example of fuselage 16, the stiffeners 32 include a plurality of frame members, or frames, 34 that are operatively coupled to and that extend circumferentially around the inner side of the skin 30 and that are spaced longitudinally along the fuselage 16. The stiffeners 32 also include a plurality of stringers 36 that are operatively coupled to and that extend longitudinally along the inner side of the skin 30 and that are spaced circumferentially around the fuselage 16. In some embodiments of stiffened composite structures 12, although not required, the skin 30 may be constructed of a plurality of skin segments 38 that collectively define the skin 30, or at least a portion of the skin 30 of a stiffened composite structure 12.

FIGS. 3-27 provide schematic representations of various systems 100 and methods 200 for assembling composite structures 12. FIGS. 3-4, 14, and 26-27 provide schematic representations of illustrative, non-exclusive examples of systems 100 for assembling composite structures 12; FIGS. 5, 6, 13, 17, and 23 provide flowcharts schematically representing illustrative, non-exclusive examples of methods 200 for assembling composite structures 12; and FIGS. 7-12, 15-16, 18-22, and 24-27 provide somewhat less schematic but still non-exclusive examples of component parts of systems 100, such as that perform and/or are utilized in connection with the performance of one or more steps of methods 200.

Figure 3:
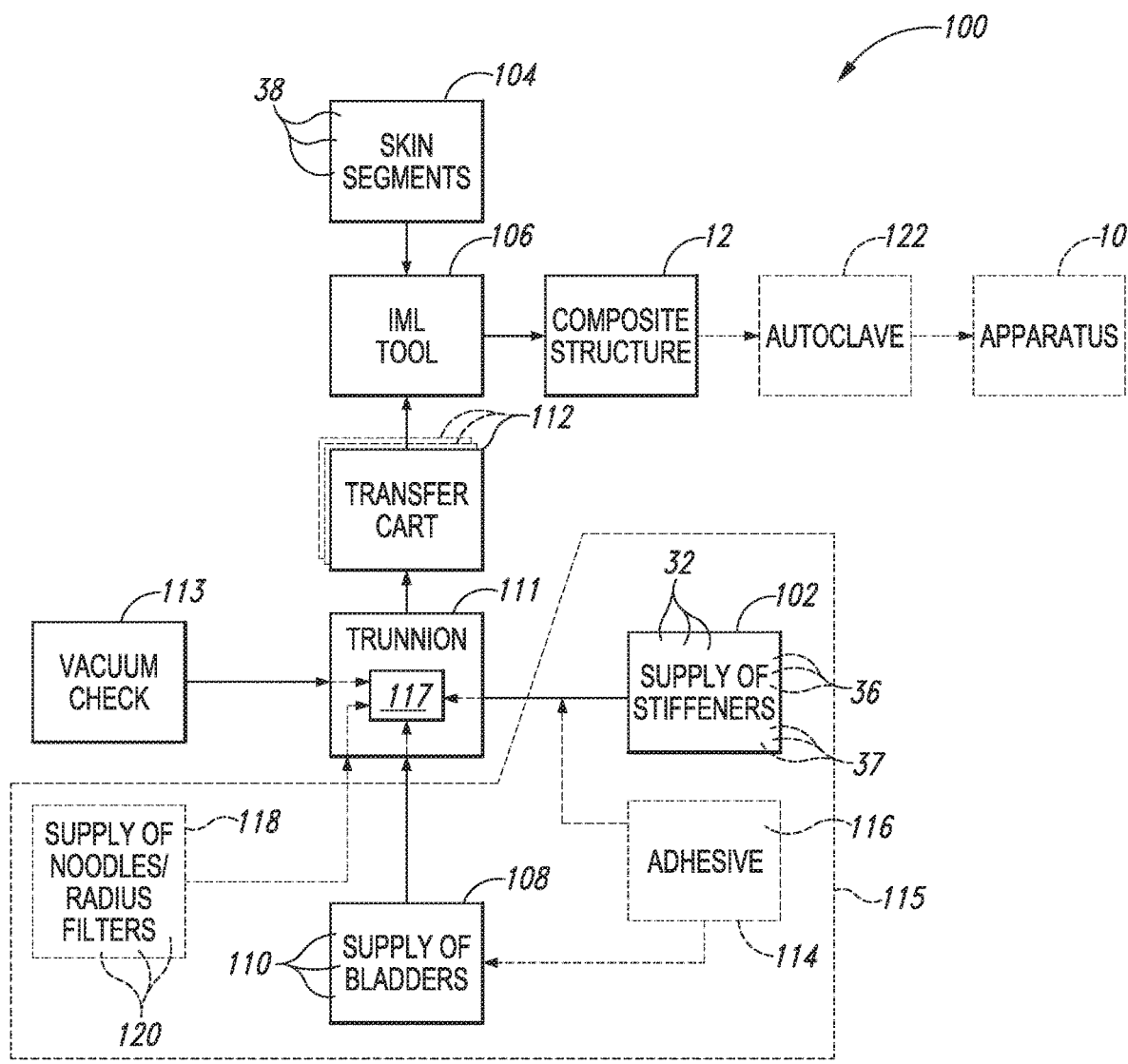
FIG. 3 is a schematic diagram representing systems for assembling stiffened composite structures.

FIG. 3 additionally or alternatively may be described as schematically representing, or illustrating, the flow of materials through a manufacturing facility, with the flow of materials ultimately resulting in a stiffened composite structure 12, and optionally resulting in a fully assembled apparatus 10. In FIGS. 3-27, some elements may be illustrated in dashed lines, schematically representing that such elements may be optional or may correspond to an optional version of a system 100 and/or method 200. That said, not all systems 100 and methods 200 are required to include the elements illustrated in solid lines. The schematic representations of systems 100 and methods 200 in FIGS. 3-27 are not limiting and other systems 100, component parts of systems 100, methods 200, and steps of methods 200 are within the scope of the present disclosure, including systems 100 having greater than or fewer than the number of illustrated elements, as well as methods 200 having greater than or fewer than the number of illustrated steps, as understood from the discussions herein. As also understood from the discussions herein, methods 200 are not required to have the schematically represented steps of FIGS. 5, 6, 13, 17, and/or 23 performed in the order illustrated.

With initial reference to FIG. 3, a system 100 may include a supply 102 of stiffeners 32, a supply 104 of skin segments 38, an inner mold line layup mandrel 106, a supply 108 of filler structures 110, a trunnion 111, a loading tool 112 (which may also be referred to herein as transfer cart 112 and/or a transfer tool 112), and a vacuum chuck 113. Additionally, in some embodiments, a system 100 further may include a supply 114 of adhesive 116, a supply 118 of radius fillers, or noodles, 120, and/or a curing oven or autoclave 122.

Stiffeners 32 may be, for example, a supply of stringers 36 or stringer segments 37. Stringers 36 and/or stringer segments 37 may be of varying sizes or types, or of all the same size or type. In some examples, a plurality of stringer segments 37 may be spliced together to form a complete stringer 36. For example, two or more stringer segments 37, three or more stringer segments 37, four or more stringer segments 37, and/or five or more stringer segments 37 may be spliced or otherwise joined together in order to form a complete stringer 36. Such splicing or joining may be performed on trunnion 111, as will be described in greater detail below.

A filler structure 110 is a structure that is configured to be located, or positioned, within a cavity 40 (FIG. 4) that is defined by a stiffener 32 (which may be, for example, a stringer 36), so that a skin segment 38 may be operatively affixed to a plurality of stiffeners 32 that are loaded on the inner mold line layup mandrel 106 substantially without the skin segment 38 being deformed into the stiffener cavity 40. For example, in the schematically illustrated example of FIG. 4, the stiffeners 32 are hat-shaped stringers 36 that each defines a stiffener cavity 40 for location of a corresponding filler structure 110, and with each stringer 36 including opposing flanges 151 extending longitudinally along the length of the stringers and outside of a respective stiffener form 130 of the inner mold line layup mandrel 106. However, hat-shaped stringers and flanged stringers are not required, and any suitable configuration of stiffeners, including flangeless stringers, such as flangeless hat-shaped stringers, may be used with and/or in conjunction with systems 100 and methods 200.

Figure 4:
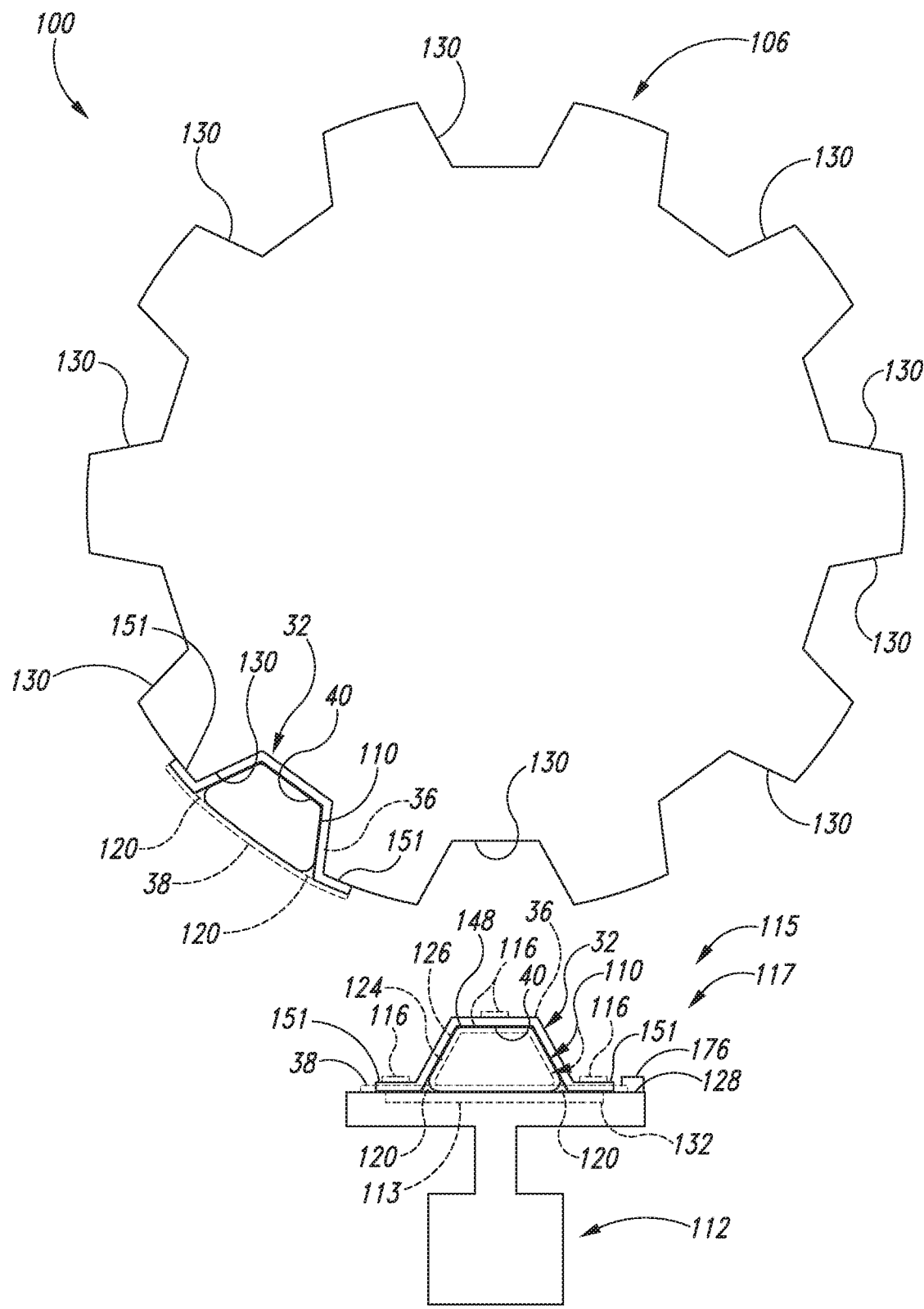
FIG. 4 is a schematic representation of systems for assembling stiffened composite structures.

Filler structures 110 additionally or alternatively may be described as cure mandrels, stringer cure mandrels, bladders, stringer bladders, and/or stringer cure bladders 110. Typically, although not required, filler structures 110 are constructed of rubber or a rubber-like material and in some applications may include a breather sock 124 extending over a body of the filler structure, and filler release material 126 extending over the breather sock 124, as schematically represented in FIG. 4. Filler structures 110 may be removable after the stiffened composite structure has been cured, in some examples.

Adhesive 116, when utilized, may take any suitable form, and may be configured to operatively affix filler structures 110 within the cavities 40 of stiffeners 32. A curing oven, or autoclave, 122 is a tool that is configured to receive a stiffened composite structure 12, or portion thereof, and to cure the stiffened composite structure 12, or portion thereof.

Generally, one or more stiffeners 32 may be positioned on trunnion 111. For example, in one specific example, three stringer segments 37 may be positioned on trunnion 111. One or more filler structures 110 may be obtained from the supply of filler structures 108 and positioned within stiffener cavity 40 of stringer segments 37. One or more radius fillers 120 from supply 118 of radius fillers may be positioned to smooth the interface of filler structure 110 and stiffener 32 (e.g., a noodle 120 may be positioned along each longitudinal side of a bladder 110 positioned within stringer 36) to form a sub-assembly 117 (which also may be referred to herein as a stiffener assembly 117) positioned on trunnion 111. Radius fillers 120 may be configured to provide a smoother interface between filler structure 110 and stiffener 32, so that once skin 30 is applied (thereby enclosing filler structure 110 and radius fillers 120 within cavity 40 of stiffener 32), radius fillers 120 may prevent or reduce stresses in skin 30 at the interface of filler structure 110 and stiffener 32.

Finally, vacuum chuck 113 may be applied to the sub-assembly 117 on trunnion 111, thereby compacting stiffener 32, filler structure 110, and radius fillers 120. The combination of stiffener 32, filler structure 110, radius fillers 120, vacuum chuck 113, and/or adhesive 116 may be referred to as assembly 115. Assembly 115 may be transferred from trunnion 111 onto transfer cart 112, and transported into a suitable position near inner mold line layup mandrel 106, in order to transfer assembly 115 onto inner mold line layup mandrel 106.

Some embodiments of stiffened composite structures 12, including the skin 30 (FIG. 2) and the stiffeners 32, may be constructed of fiber reinforced composite material. Fiber reinforced composite materials additionally or alternatively may be described as or referred to as fiber-reinforced polymers, or plastics. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers. In some embodiments, the fibers may be woven into a fabric. In some embodiments, the skin 30 and/or the stiffeners 32 may be constructed of multiple layers, or plies, of fiber-reinforced composite material. In some such embodiments, the plies may be pre-preg plies, which are layers, or sheets, of fibers that are pre-impregnated with the associated binding material. Accordingly, multiple pre-preg plies may be layered to collectively define a segment of fiber reinforced composite material having desired properties and characteristics. The binding material of pre-preg plies may be partially cured, or pre-cured, so as to permit handling of the plies and selective assembly of the plies. Typically, partially cured pre-preg plies are tacky to the touch and therefore easily stick together when layered, but not necessarily in a permanent fashion. That is, when layered, two adjacent plies may be permitted to translate laterally relative to each other and/or may be able to be separated, if so desired. To more permanently affix adjacent layers of plies together, the layered plies may be compacted, or compressed, together, utilizing any suitable method and at any suitable and various times during the construction of a fiber reinforced composite structure. This compression of two or more layers is referred to as compaction, or as compacting, of the plies. The term "compacting" also may be used to describe the adhering, mounting, or otherwise affixing of a tool, such as a filler structure 110, to a composite structure 12, such as a stiffener 32.

In the illustrated example of FIG. 4, an illustrative, non-exclusive example of an inner mold line layup mandrel 106 is presented schematically and is generally cylindrical, corresponding to a generally cylindrical stiffened composite structure 12 that includes a plurality of spaced-apart stiffener forms 130, with each stiffener form 130 having an outer surface that corresponds to one side of a respective stiffener 32 that is to be loaded into a respective stiffener form 130. The schematic representation of the inner mold line layup mandrel 106 is not illustrated to scale, and as an illustrative, non-exclusive example, an inner mold line layup mandrel 106 that is configured for assembly of fuselages 16 may include more than 20, more than 50, more than 75, or even more than 100 stiffener forms 130 corresponding to a plurality of stringers 36.

FIG. 4 schematically illustrates a filler structure 110 operatively positioned on the upper surface 128 of the loading tool 112 and a stiffener 32 operatively positioned on the upper surface 148 of the filler structure 110. A first stiffener 32 and corresponding filler structure 110 are already loaded on the inner mold line layup mandrel 106, and the loading tool 112 may be operatively positioned, for example, underneath inner mold line layup mandrel 106 for subsequent loading of a second stiffener 32 and corresponding filler structure 110. The loading tool 112 has raised the stiffener 32 and corresponding filler structure 110 into a stiffener form 130 of the inner mold line layup mandrel 106. In FIG. 4, the stiffeners 32 are illustrated as flanged hat-shaped stringers; however, as discussed herein, hat-shaped stringers and flanged stringers are not required to be used in all systems 100 and methods 200, and any suitable configuration of stringers, including flangeless stringers, may be used.

While FIG. 4 schematically illustrates the loading of a filler structure 110 and stiffener 32 from underneath the inner mold line layup mandrel 106, such a configuration is not required in all systems 100 and methods 200, and it is within the scope of the present disclosure that a loading tool 112 may be configured to operatively load a filler structure 110 and stiffener 32 from any suitable orientation relative to the inner mold line layup mandrel 106. For example, a loading tool 112 may be configured to load an assembly 115 onto any suitable location on the inner mold line layup mandrel 106, including locations that are at an angle relative to the horizontal, and including locations on the bottom half of the inner mold line layup mandrel 106, as well as locations on the upper half of the inner mold line layup mandrel 106.

Figure 5:
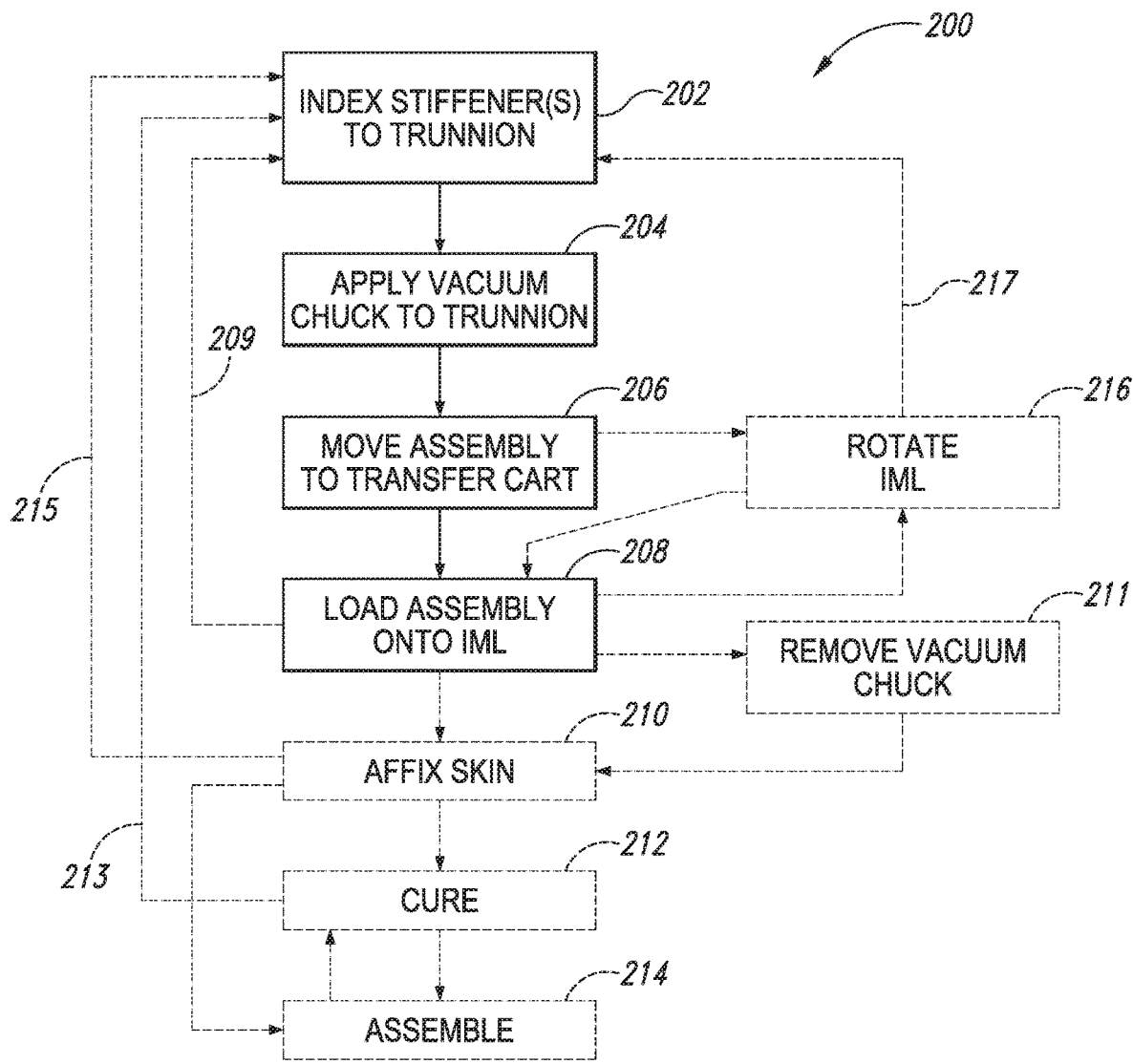
FIG. 5 is a flowchart schematically representing methods of assembling stiffened composite structures.
Figure 6:
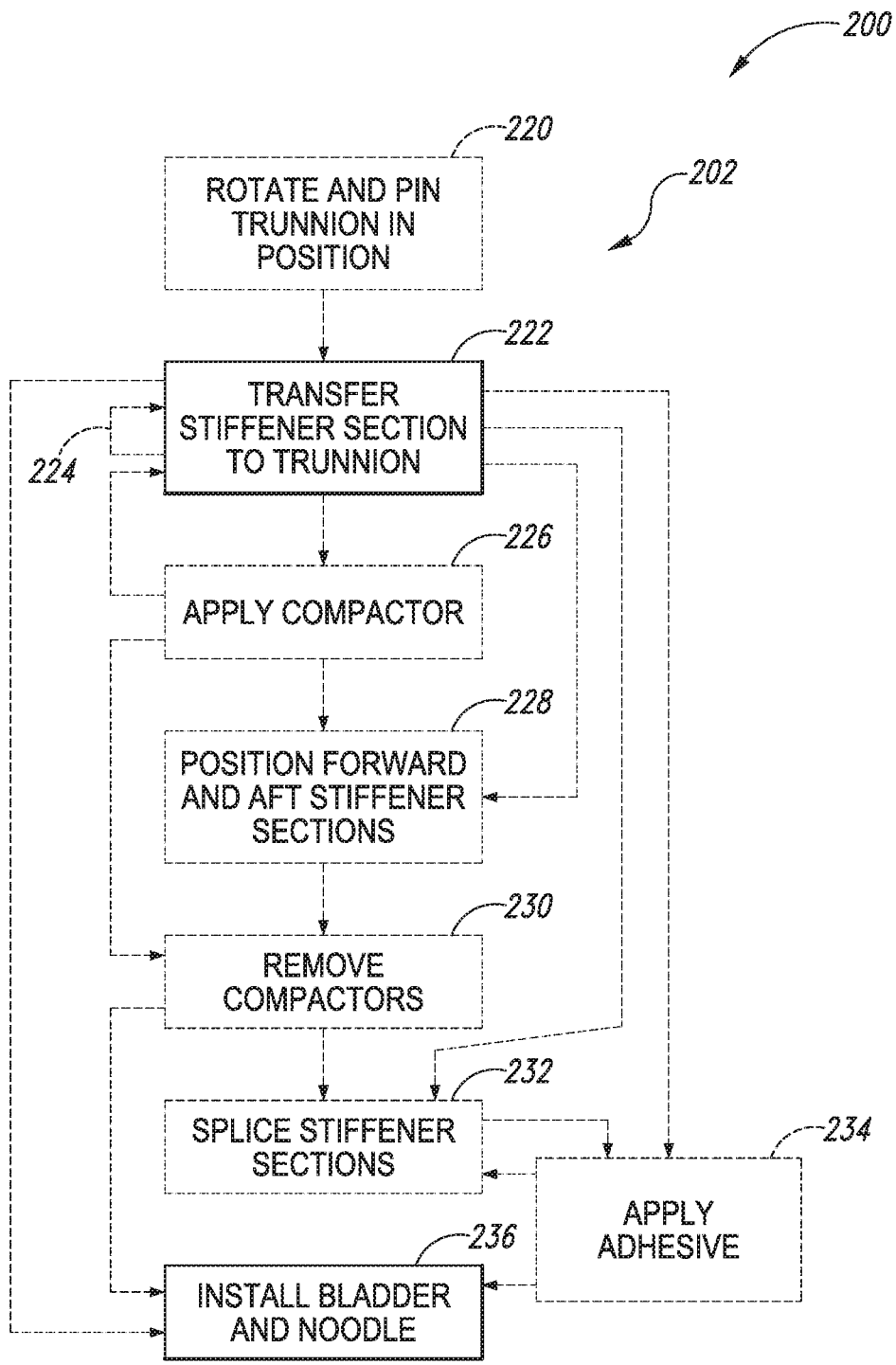
FIG. 6 is a flowchart schematically representing methods of indexing stiffeners and filler structures in a trunnion according to the present disclosure.

FIG. 5 illustrates a schematic flowchart diagram of examples of methods 200 of forming a composite structure 12 using disclosed systems 100. FIG. 5 illustrates an overview of methods 200, whereas FIGS. 6, 13, 17, and 23 illustrate flowcharts of more details of the steps shown in FIG. 5. Generally, methods 200 may include indexing stiffeners 32 to trunnion 111 at 202, applying vacuum chuck 113 to trunnion 111 at 204, thereby forming assembly 115, moving assembly 115 to transfer cart 112 at 206, and loading assembly 115 onto inner mold line layup mandrel 106 at 208. The indexing 202, applying 204, moving 206, and loading 208 may be repeated at 209 any suitable number of times to apply a plurality of assemblies 115 to inner mold line layup mandrel 106. In this manner, a plurality of stiffener forms 130 of inner mold line layup mandrel 106 may each contain a respective assembly 115 (e.g., a stringer 36 formed from a plurality of stringer segments 37, one or more filler structures 110, one or more radius fillers 120, a vacuum chuck 113, and/or adhesive 116). In some examples, each stiffener form 130 of inner mold line layup mandrel 106 may contain a respective assembly 115. In other examples, only a portion of the stiffener forms of inner mold line layup mandrel 106 may contain a respective assembly 115. Steps 202, 204, 206, and 208 may be repeated at 209 as many times as desired until the desired number of assemblies 115 have been applied to inner mold line layup mandrel 106.

Throughout the methods 200, the same vacuum chuck 113 may be used to compact sub-assembly 117 to trunnion 111 (at 204), move sub-assembly 117 from trunnion 111 to transfer tool 112 (at 206), and vacuum chuck 113 may be loaded with sub-assembly 115 onto inner mold line layup mandrel 106 (at 208) such that vacuum chuck 113 may also be used to compact sub-assembly 115 to inner mold line layup mandrel 106. After applying one or more assemblies 115 to inner mold line layup mandrel 106 at 208, a skin 30 (e.g., one or more skin segments 38) may be affixed to inner mold line layup mandrel 106 at 210. For example, a plurality of skin segments 38 may be affixed around the circumference of inner mold line layup mandrel 106, thereby enclosing the assemblies 115 or sub-assemblies 117 between the skin segments 38 and inner mold line layup mandrel 106. In some methods 200, vacuum chuck 113 may be removed at 211 before applying skin segments 38 such that sub-assemblies 117 are positioned in stiffener forms 130 of inner mold line layup mandrel 106 without vacuum chuck 113.

The resulting structure may be cured at 212 to form a composite structure 12 according to the present disclosure. As discussed, some apparatuses 10 may include several stiffened composite structures 12 that are assembled together to collectively define the apparatus 10 or a greater stiffened composite structure 12. Aircraft 14 and fuselages 16 are such examples, with an illustrative, non-exclusive example of a fuselage 16 having more than one barrel section 18. Accordingly, as optionally and schematically indicated in FIG. 5, some methods 200 further may include repeating the indexing 202, applying 204, moving 206, and applying 208, as at 213, 215, and/or at 217, as many times as necessary to form another portion of a stiffened composite structure 12. Following the formation of multiple formed portions of a stiffened composite structure 12, the multiple formed portions may be assembled together, as indicated at 214. Depending on the size of the stiffened composite structure 12 and/or the portions thereof, each portion may be cured at 212, either prior to final assembly, or multiple portions may first be assembled and then the entire assembly may be cured at 212.

Some methods 200 optionally include rotating the inner mold line layup mandrel 106 at 216 to position the inner mold line layup mandrel 106 prior to applying assembly 115 or sub-assembly 117 to inner mold line layup mandrel 106 at 208. Additionally or alternatively, in some methods, inner mold line layup mandrel 106 may be rotated at 216 after the loading 208 of a first assembly 115 or sub-assembly 117 and prior to the indexing 202 for subsequent loading of a subsequent assembly 115 or sub-assembly 117.

Now with reference to FIGS. 6-12 methods 200 of indexing a stringer 36 or other stiffener 32 to a trunnion 111 are schematically illustrated. Trunnion 111, which may also be referred to as a chuck rotation tool 111 is shown generally in FIG. 7. Trunnion 111 may include an elongate rotatable chuck 150 having a forward end 152 and aft end 154, each end 152, 154 being supported by a support structure 156. Support structures 156 may include one or more wheels 158 that may be configured to roll the trunnion 111 to a desired location. One or both of the support structures 156 also may include a respective mechanism for raising and lowering the rotatable chuck with respect to the support structures 156, and/or for rotating the rotatable chuck 150 about its longitudinal axis (e.g., in the direction indicated by arrow 165). For example, a representative mechanism may include one or more adjustment wheels 160, 161, 162, 163 at the forward and/or aft ends 152, 154.

In some examples, adjustment wheels 161, 163 may be configured to selectively move rotatable chuck 150 up and down along arrow 164 with respect to supports 156, whereas adjustment wheels 160, 162 may be configured to rotate rotatable chuck 150 about its longitudinal axis, as indicated by arrow 165. Rotatable chuck 150 may include a plurality of sides 166 extending between forward end 152 and aft end 154, each side 166 having a stiffener tray 168 positioned thereon, or coupled thereto. The illustrated example of trunnion 111 includes four sides 166, positioned at 90 degree angles to one another, thereby forming a substantially square-shaped rotatable chuck 150, however other configurations are also possible. For example, rotatable chuck 150 may include two or more, three or more, four or more, five or more, six or more, seven or more, and/or eight or more sides 166, where some or all of the sides include a stiffener tray 168.

Each respective stiffener tray 168 may be configured to receive a different type or size of stiffener in some examples. For example, each respective stiffener tray 168 may include a trough 170 configured to receive a stiffener 32. For example, troughs 170 may be shaped as a female mold for stiffeners 32 such as stringers 36. Each respective trough 170 may have a different depth, width, and/or angles formed therein, thereby being configured to receive different types or sizes of stiffeners 32. In this manner, some examples of trunnions 111 may be configured such that a single trunnion 111 may be used with a plurality of types of stiffeners, thereby eliminating the need for multiple sets of tooling in the manufacture of certain composite structures 12 requiring more than one type of stiffener 32. Each stiffener tray 168 or corresponding side 166 of rotatable chuck 150 may be color-coded or otherwise labeled for easy reference as to what type of stiffener 32 each respective stiffener tray 168 is configured to receive.

Figure 8:
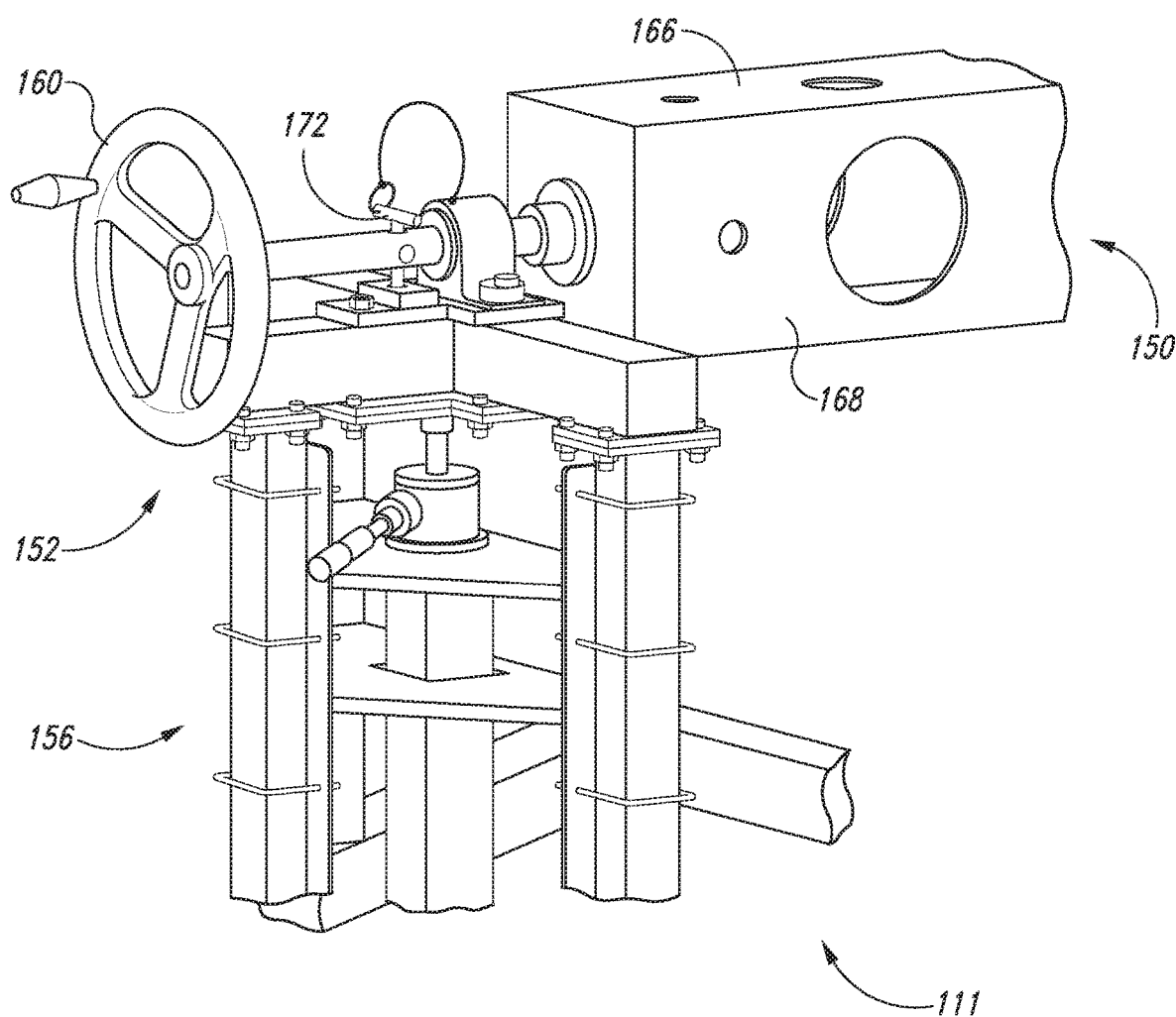
FIG. 8 is a schematic perspective view of a portion of the stringer trunnion of FIG. 7.

In some methods 202 of indexing a stiffener 32 (e.g., a plurality of stringer segments 37) onto trunnion 111, rotatable chuck 150 may first be rotated at 220 to position a desired side 166 and corresponding stiffener tray 168. For example, once the desired stiffener type is determined, rotatable chuck 150 may be rotated until the side 166 including the corresponding stiffener tray 168 is on top, or facing upwards. Rotatable chuck 150 may be held in position using one or more retaining pins 172 (as illustrated in FIG. 8). In some examples, a first retaining pin 172 may be inserted at or near forward end 152 of trunnion 111 and a second retaining pin 172 may be inserted at or near aft end 154 of trunnion 111. Retaining pins 172 may be configured to prevent rotation of rotatable chuck 150 when retaining pins 172 are inserted into trunnion 111.

One or more stiffeners 32, such as a stringer segment 37 may be loaded into a stiffener tray 168 of trunnion 111 at 222. A portable vacuum, robot, or other device may be used to transfer a stiffener 32 from a supply 102 of stiffeners 32, and the transferring 222 may be repeated at 224 any suitable number of times, depending on the number of stiffeners 32 being transferred to trunnion 111 at 222. For example, for a stringer 36 made up of three stringer segments 37, a first stringer segment 37 may be transferred to trunnion 111 at 222, and the transferring 222 may be repeated at 224 to transfer a second, third, fourth, and/or fifth stringer segment 37 to trunnion 111 in some examples. Any number of stringer segments 37 may be placed within a given stiffener tray 168 to form a complete stringer 36. At the time of transfer to trunnion 111, stiffeners 32 may be pre-formed (but uncured) or may be transferred to trunnion 111 as unformed stringer charges and formed in a stiffener tray 168 of trunnion 111.

Figure 9:
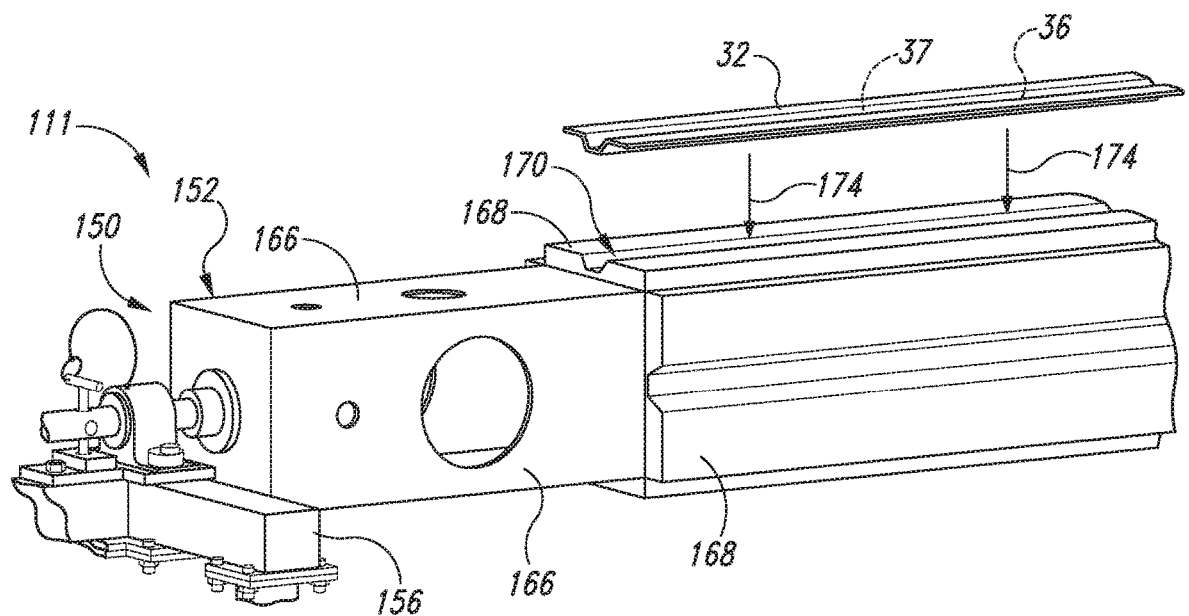
FIG. 9 is a perspective view of a portion of the stringer trunnion of FIG. 7, with a stringer segment in the process of being placed within the trunnion.

FIG. 9 illustrates placement of a stiffener 32 (e.g., a stringer 36 or stringer segment 37) within trough 170 of stiffener tray 168 of rotatable chuck 150 of trunnion 111 in the direction indicated by arrows 174. In some examples, a first stringer segment 37 may be loaded near the forward end 152 of trunnion 111, and a second stringer segment 37 may be loaded near the aft end 154 (FIG. 7) of trunnion 111. First and second stringer segments 37 may be loaded within stiffener tray 168 such that a portion of each stringer segment 37 overlaps, or may be loaded such that a portion of trough 170 is exposed in a gap between the first and second stringer segments 37.

Figure 10:
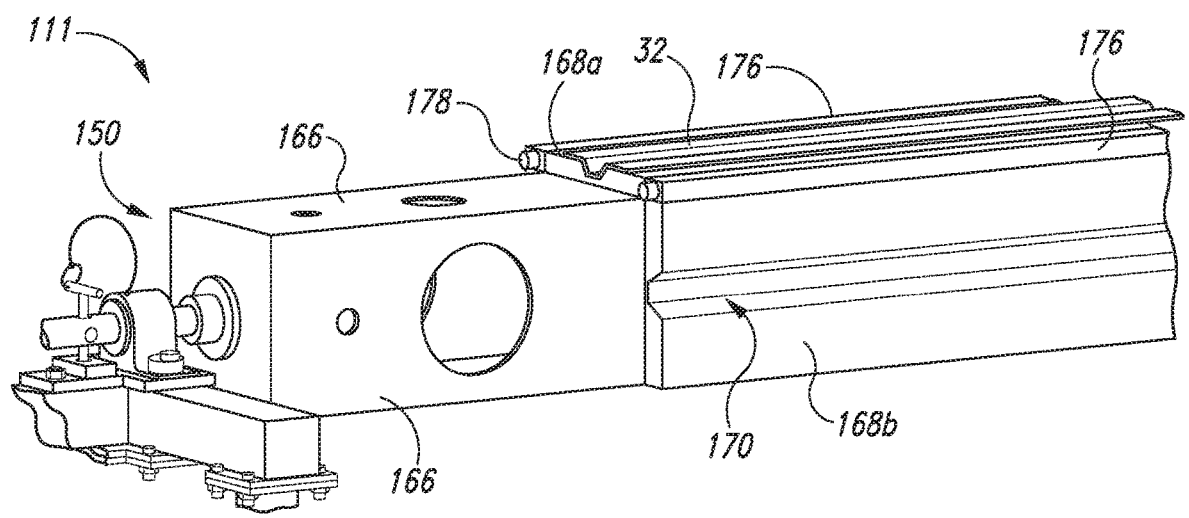
FIG. 10 is a schematic representation of the portion of the stringer trunnion of FIG. 9 including vacuum ports in place on the trunnion.

As shown in FIG. 10, one or more vacuums 176 may be applied to trunnion 111 at 226. Vacuums 176 may also be referred to herein as compactors 176 but need not necessarily be used to compact stiffeners 32. A vacuum source may be applied to vacuums 176 via ports 178 in order to hold stiffener 32 within trough 170 and maintain the shape of stiffener 32. In some examples, each stiffener tray 168 may be configured to receive two vacuums 176, each vacuum 176 extending along a longitudinal edge of the active stiffener tray (e.g., stiffener tray 168a). In these examples, each end of each vacuum 176 may include a vacuum port 178, and a vacuum source may be coupled at each location of vacuum port 178. In some examples, inactive stiffener trays (e.g., stiffener tray 168b) may be sealed to allow for a proper vacuum to be applied to active stiffener tray 168a.

Figure 7:
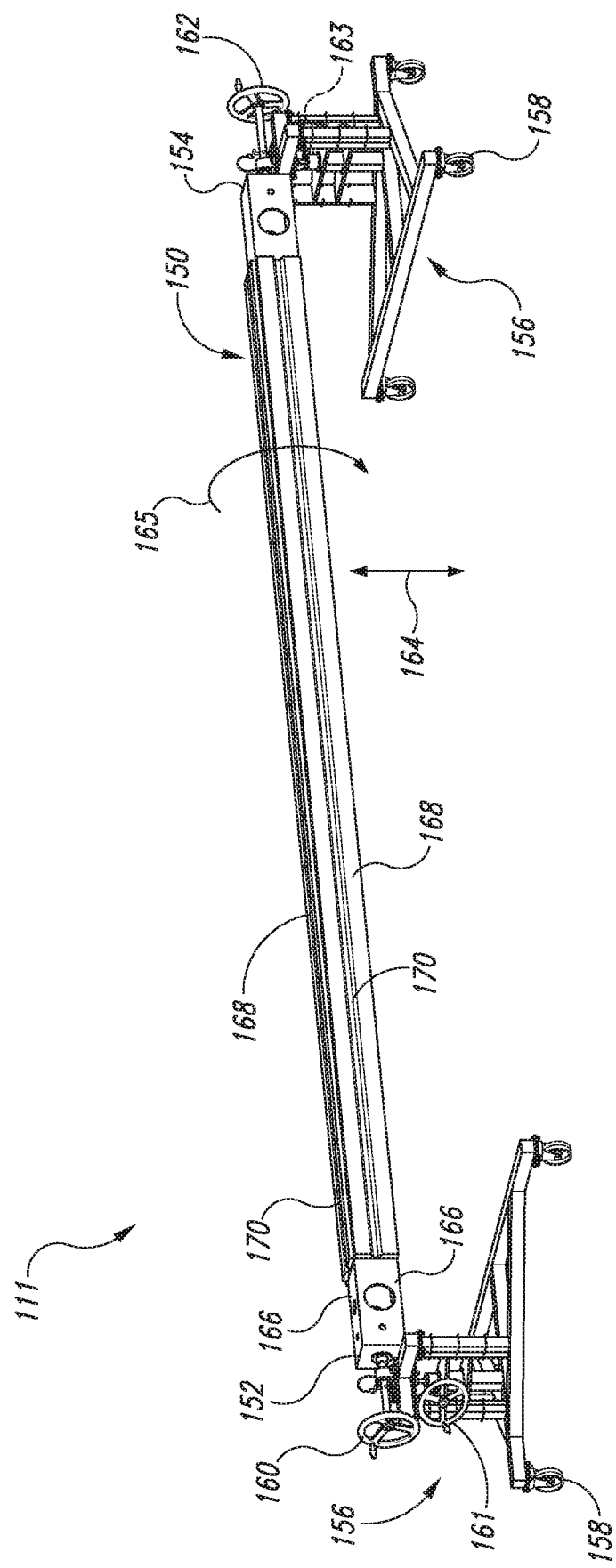
FIG. 7 is a schematic perspective view of a stringer trunnion according to the present disclosure.
Figure 11:
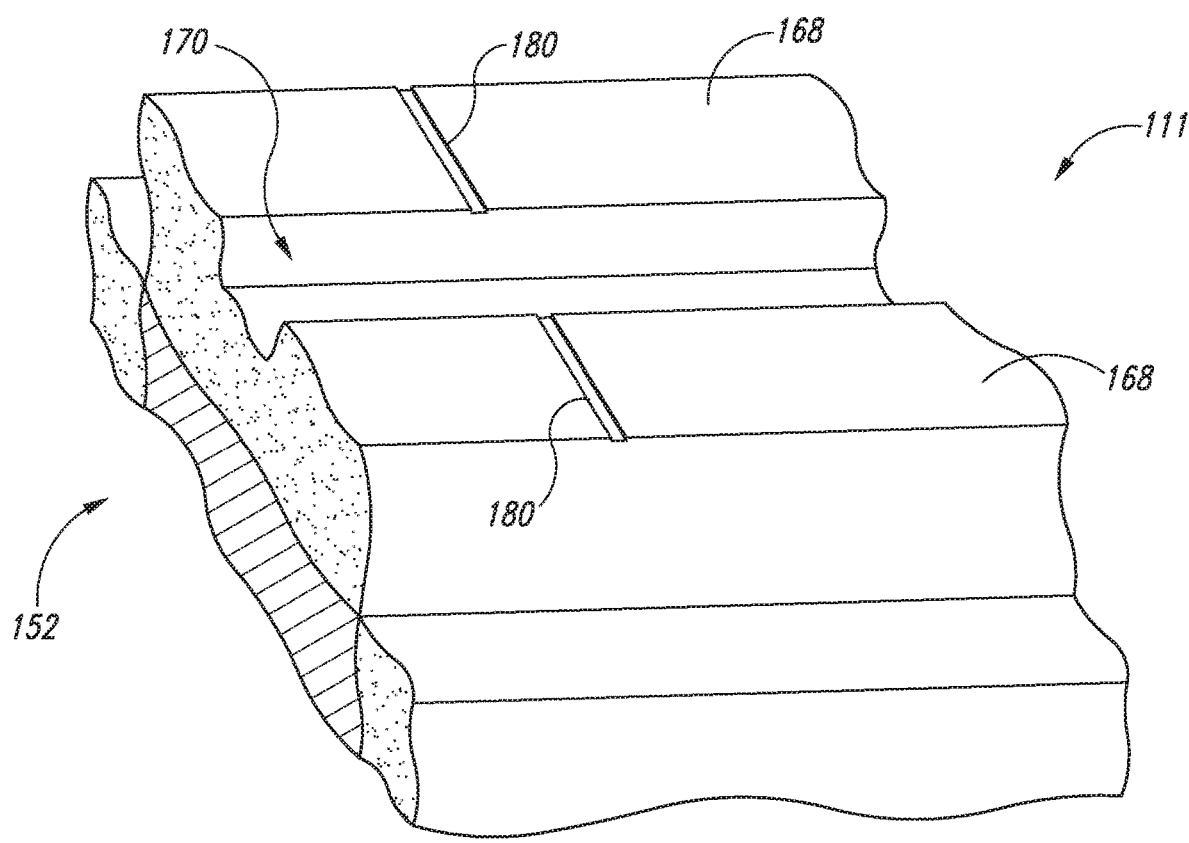
FIG. 11 is a schematic representation of a portion of the stringer trunnion of FIG. 7.

While vacuums 176 are active on trunnion 111, stiffeners 32 may be more accurately located on trunnion 111 at 228. For example, as shown in FIG. 11, trunnion 111 may include one or more lasers or scribe lines 180 for positioning stiffeners 32. In some examples, trunnion 111 may include a first scribe line 180 near forward end 152 and a second scribe line 180 near aft end 154 (FIG. 7). Trunnion 111 may include one or more indicators for placing and aligning stiffeners 32 or segments thereof. For example, trunnion 111 may include a plurality of scribe lines 180, a plurality of lasers may be projected onto trunnion 111, trunnion may include one or more lights that may indicate proper alignment, a localized positioning device may be used, and/or trunnion 111 may include one or more hard indexing structures (e.g., indexing pins, a hard stop, and/or a surface or structure configured to ensure proper positioning) to serve to align one or more stiffener segments 37 within stiffener tray 168. In one example, trunnion 111 may include a scribe line 180 for each stiffener 32 (e.g., for each stringer segment 37). In some examples, trunnion 111 may include two scribe lines 180 for each stringer segment 37 (e.g., trunnion 111 may include a scribe line 180 for the forward end of each stringer segment 37 and a scribe line for the aft end of each stringer segment 37). In some examples, each end of stiffener 32 may be positioned adjacent a scribe line 180 to position the stiffener 32 on the stiffener tray 168. Scribe lines 180 or other markings may be included on the trunnion itself (e.g., on a side 166 of rotatable chuck 150) and/or on stiffener trays 168. In other embodiments, other methods of aligning and positioning stringer segments 37 may be used. Vacuums 176 may remain active while each stiffener segment 37 is placed on trunnion 111.

Once the desired stiffeners 32 are positioned, vacuums 176 may be deactivated from trunnion 111 (e.g. the vacuum source may be turned off or disconnected from vacuum ports 178) at 230. In some examples, an additional stiffener 32 may be placed on trunnion 111 at 232. For example, for methods 200 in which a forward stringer segment 37 and an aft stringer segment 37 were positioned at 228, a middle stringer segment 37 may be spliced onto the previously placed stringer segments 37 at 232. In some examples, a middle stringer segment 37 may be placed into trough 170 such that a portion of middle stringer segment 37 overlaps a portion of each of the forward stringer segment 37 and aft stringer segment 37. A plurality of stringer segments 37 may thus be spliced together in order to form a full-length stringer 36. Adhesive 116 may be applied at 234 to splice the stringer segments together in some examples. Stringer segments 37 may be formed of pre-impregnated materials (e.g., pre-impregnated carbon fiber) and thus may be automatically spliced together at portions where respective stringer segments 37 overlap with one another when stiffener 32 is compacted, without the use of adhesive 116 in some examples. In some examples, respective stringer segments 37 may be placed end to end without overlap, and one or more layers of pre-impregnated material ("plies") may be placed across the juncture which may serve to splice the respective stringer segments 37 upon compaction.

Figure 12:
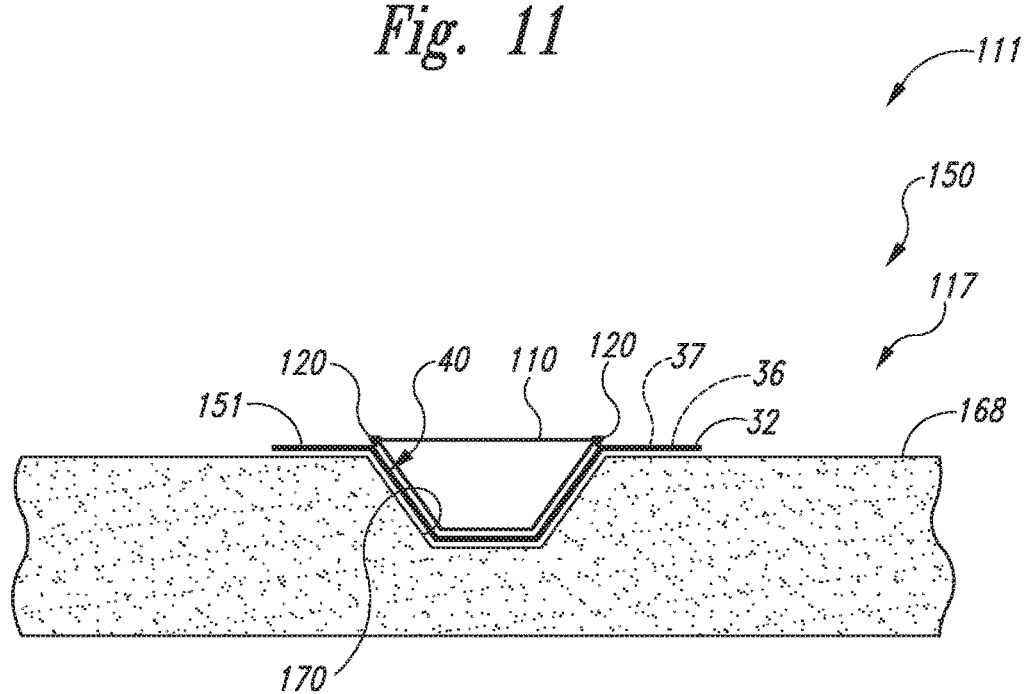
FIG. 12 is a schematic diagram representing a stringer, a bladder, and a noodle in place within the trunnion of FIG. 7.
Figure 13:
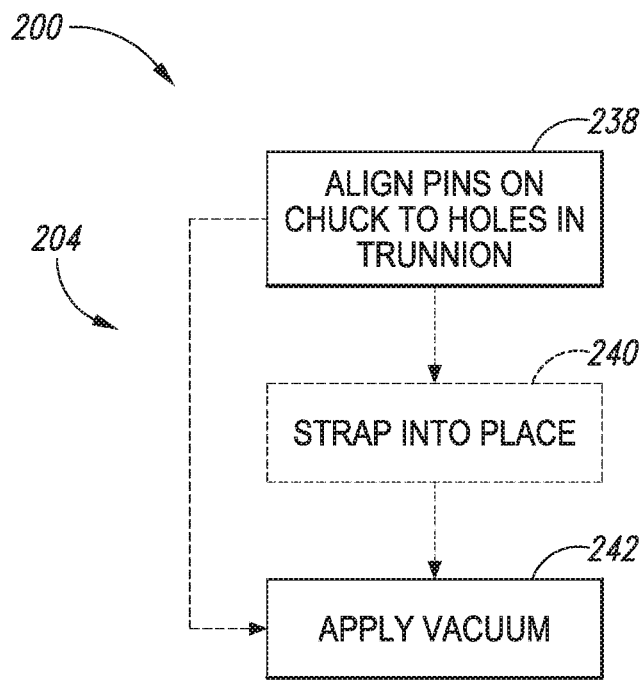
FIG. 13 is a flowchart schematically representing methods of applying a vacuum chuck to a trunnion according to the present disclosure.

A filler structure 110 (e.g., bladder 110) and radius fillers 120 (e.g., noodles 120) may be positioned within stiffener cavity 40 of stiffener 32 at 236 as schematically represented in FIG. 12. Radius fillers 120 may be positioned along the longitudinal edges of the filler structure 110. Adhesive 116 may be applied at 234 to assist with placement of bladder 110 and noodles 120 in some examples. Filler structures 110, radius fillers 120, and/or adhesive 116 may be applied by hand, using an automated device, and/or using a vacuum transfer device. The stiffener 32, bladder 110, and noodles 120 together may form a sub-assembly 117 positioned within trough 170 of rotatable chuck 150 of trunnion 111. In some examples, vacuums 176 may remain on during positioning of stiffener segments at 228, splicing of stiffener segments at 232, installing of the bladder(s) and noodle(s) at 236, and/or application of adhesive at 234.

Figure 14:
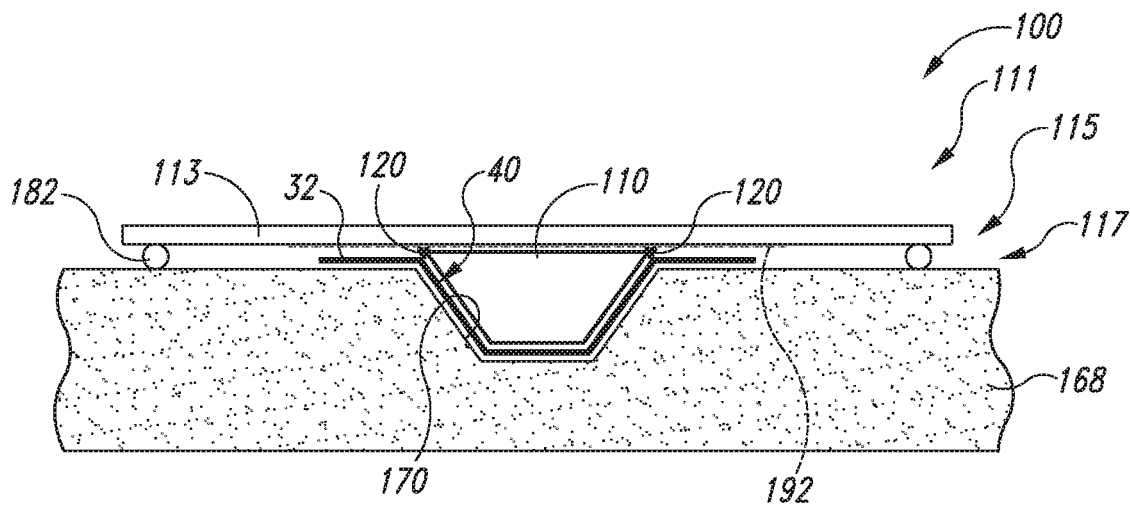
FIG. 14 is a schematic diagram representing a vacuum chuck positioned on a trunnion according to the present disclosure.
Figure 15:
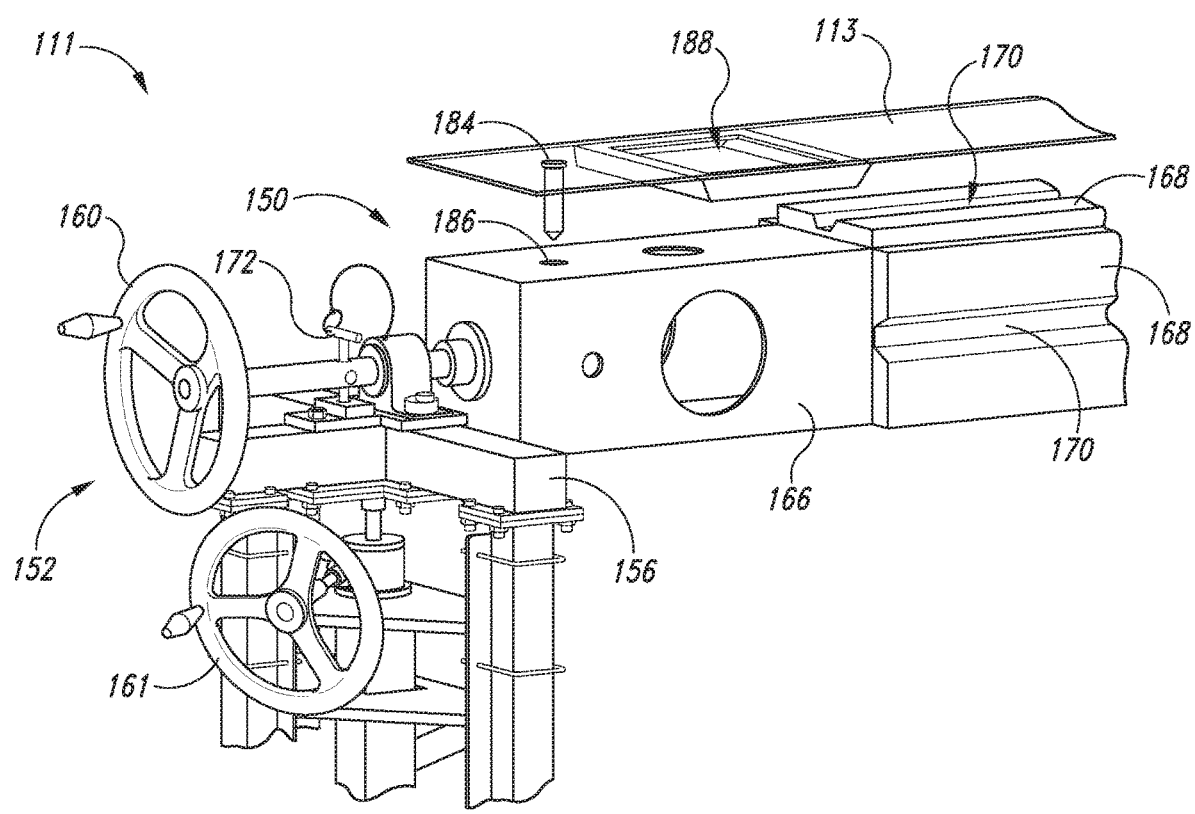
FIG. 15 is a perspective view of a vacuum chuck being positioned on a trunnion according to the present disclosure.
Figure 16:
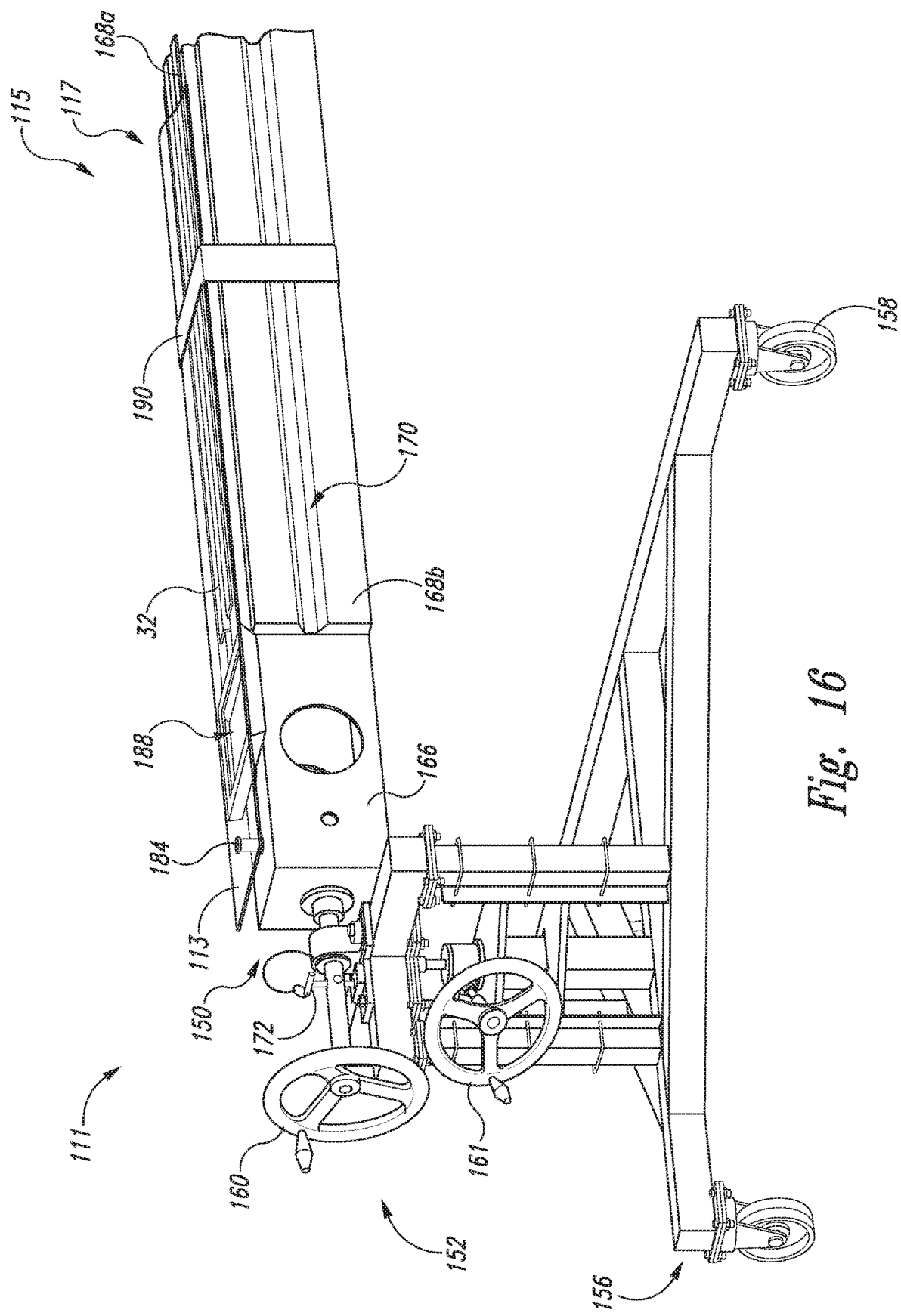
FIG. 16 is a perspective view of a portion of a trunnion according to the present disclosure having a vacuum chuck and a safety strap applied to the trunnion.
Figure 17:
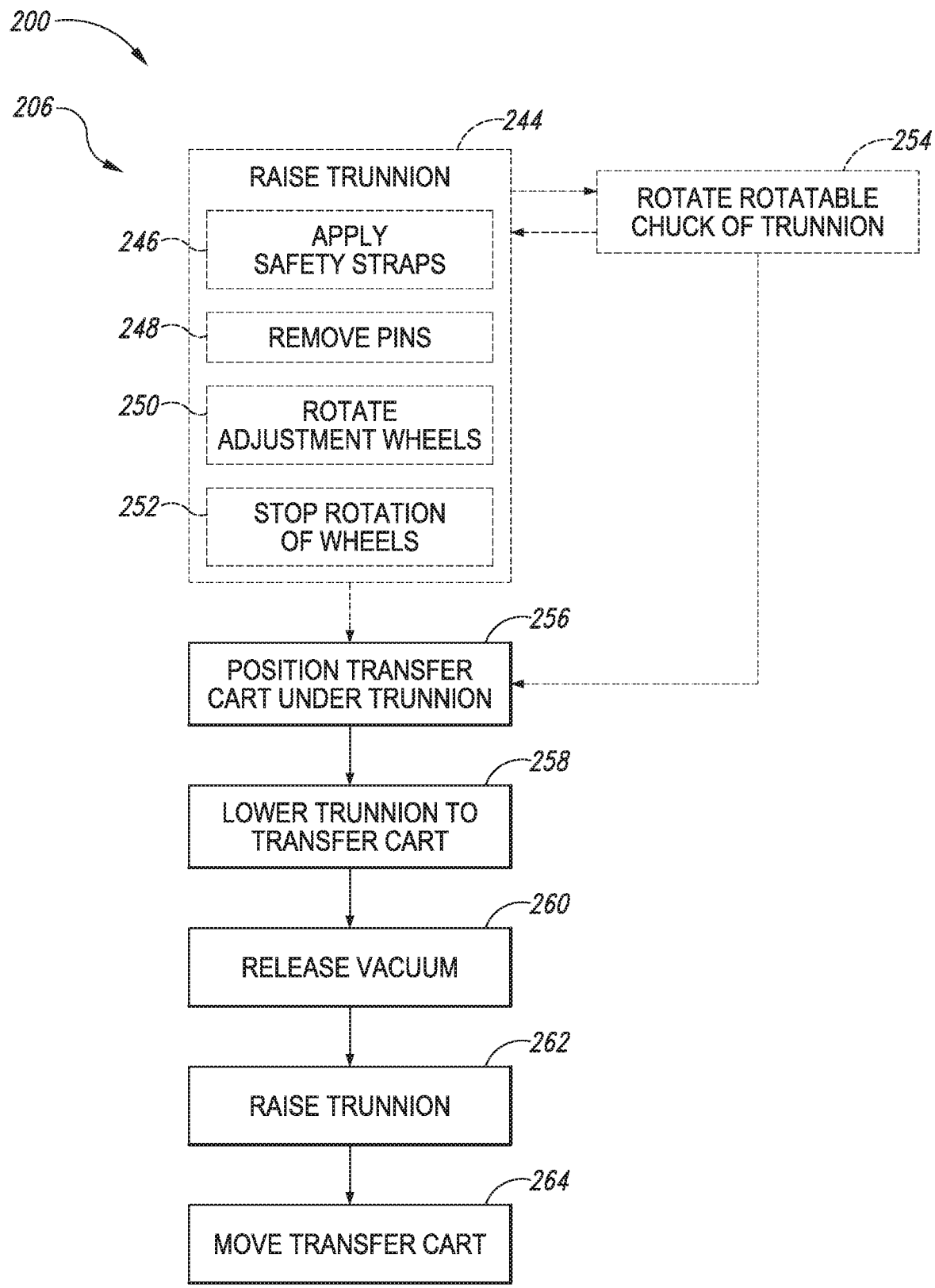
FIG. 17 is a flowchart schematically representing methods of applying a stringer to a transfer cart according to the present disclosure.

Turning now to FIGS. 13-16, methods 204 of applying vacuum chuck 113 to trunnion 111 are shown (FIG. 13), along with schematic representations of vacuum chuck 113 in place on trunnion 111 (FIGS. 14-16). A vacuum chuck 113 may be brought into proximity with trunnion 111. Vacuum chuck 113 may include one or more alignment pins 184 (e.g., an alignment pin 184 may be positioned adjacent each end of vacuum chuck 113) at 238. Each alignment pin 184 may be inserted into an alignment hole 186 formed in trunnion 111, as shown in FIGS. 15-16. Note that sub-assembly 117 is omitted from FIG. 15 for clarity. Once alignment pins 184 are inserted into alignment holes 186, vacuum chuck 113 may be lowered onto trunnion 111 until it contacts stiffener tray 168. One or more straps 190 may be applied to rotatable chuck 150 at 240 to help secure vacuum chuck 113 in place on trunnion 111 (FIG. 16).

A vacuum may be applied at 242 via a manifold 188 in order to secure vacuum chuck onto trunnion 111, thereby forming assembly 115 (e.g., stiffener 32, bladder 110, noodles 120, and vacuum chuck 113). FIG. 14 shows a schematic representation of vacuum chuck 113 in place on stiffener tray 168, which may be formed of a porous material in some examples. Seals 182 may be applied between vacuum chuck 113 and stiffener tray 168 in some examples. Such seals 182 may allow for a proper vacuum to be applied via manifold 188. Also as shown in FIG. 14, a film 192 may be included between vacuum chuck 113 and stiffener 32 in some examples. Film 192 may be, for example, a perforated FEP material, and may be configured to prevent vacuum chuck 113 from sticking to stiffener 32 and/or prevent vacuum chuck 113 from introducing contaminants to stiffener 32.

Figure 18:
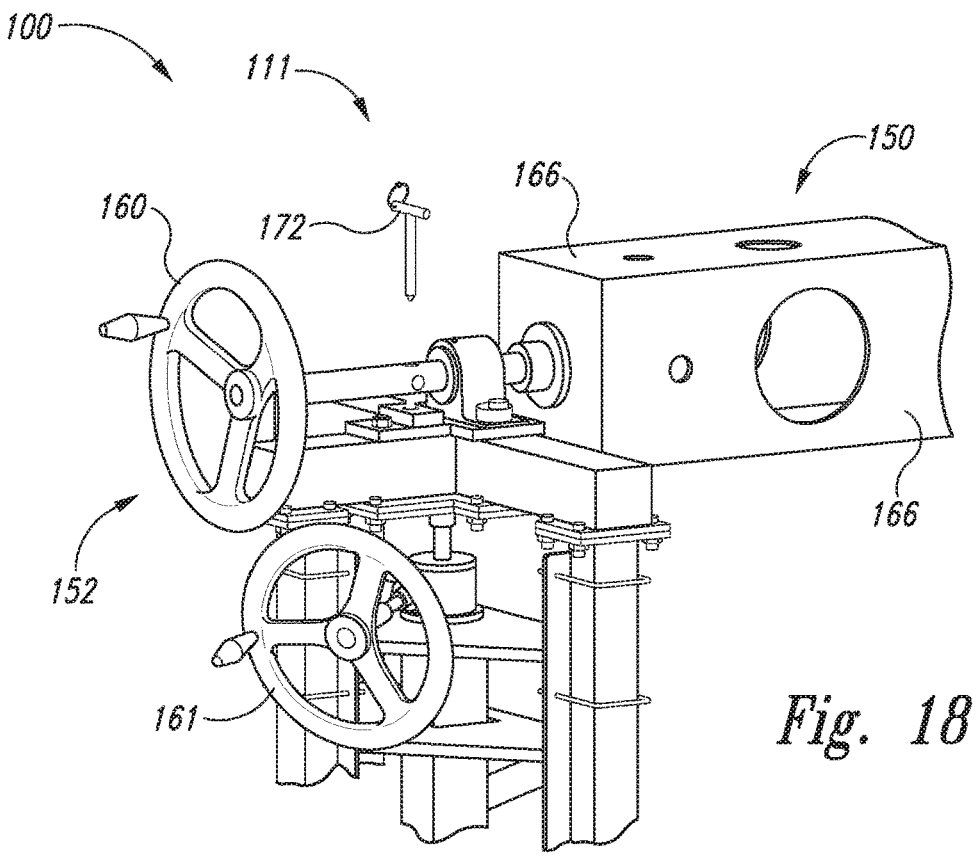
FIG. 18 is a perspective view of a portion of a trunnion according to the present disclosure, with safety pins in the process of being removed.
Figure 19:
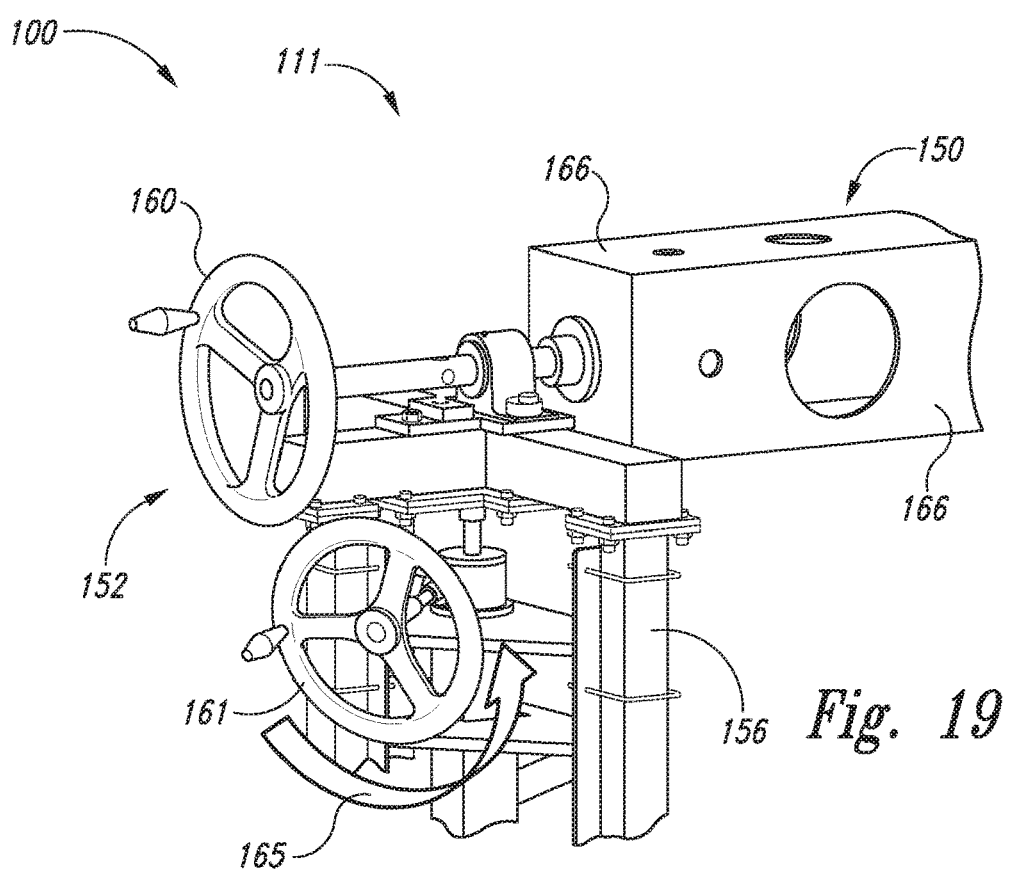
FIG. 19 shows the trunnion of FIG. 18 being raised according to the present disclosure.
Figure 20:
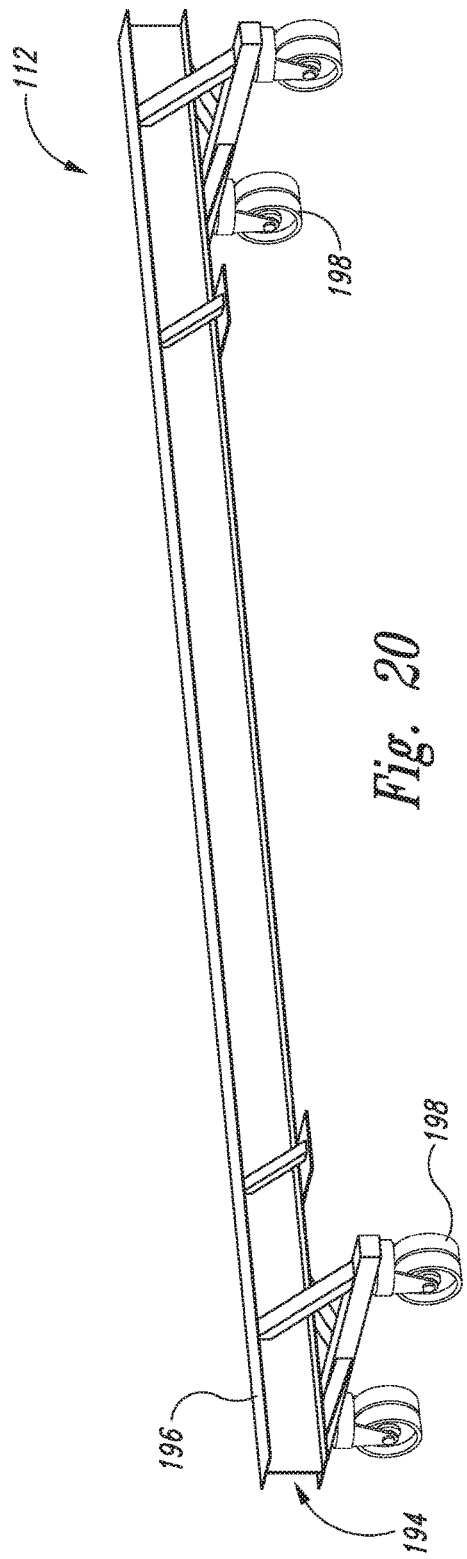
FIG. 20 is a perspective view of an example of a transfer cart according to the present disclosure.
Figure 21:
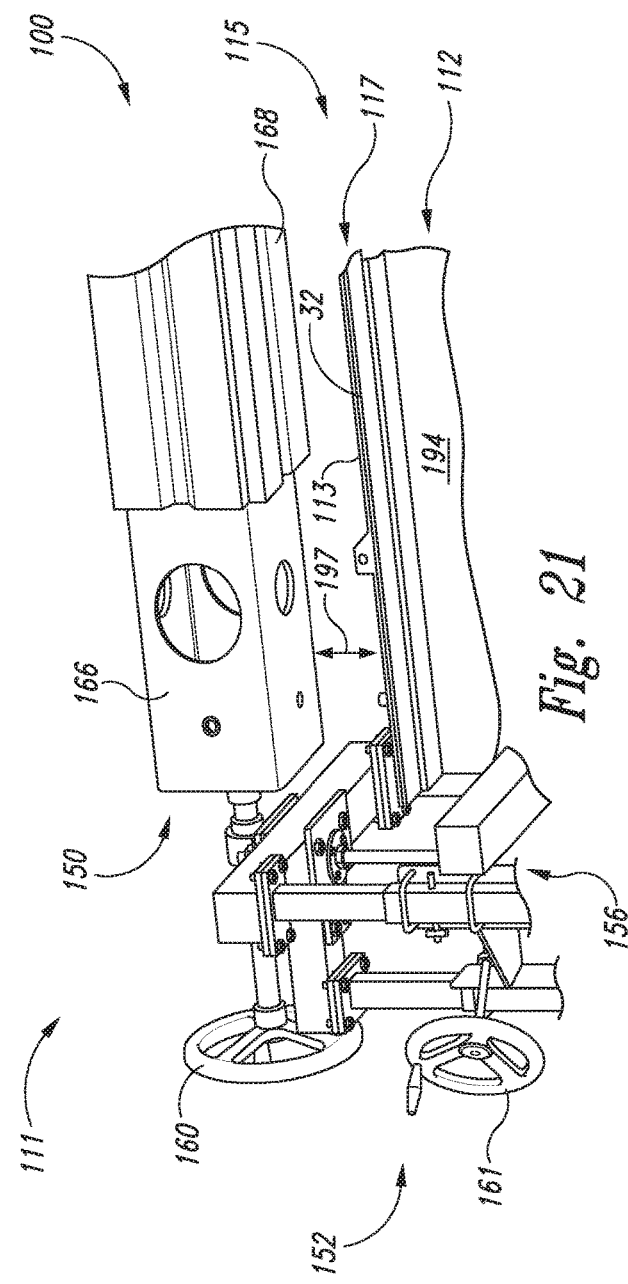
FIG. 21 is a partial perspective view of the transfer cart of FIG. 20 in position under a trunnion according to the present disclosure.

Turning now to FIGS. 17-22, methods 206 of transferring assembly 115 to transfer tool 112 are illustrated. Rotatable chuck 150 of trunnion 111 may be raised with respect to support structures 156, if needed, at 244, to a height greater than that of transfer tool 112 (FIG. 21). Alternatively, rotatable chuck 150 of trunnion 111 may be raised with respect to support structures 156 at 244 to a height less than that of the transfer tool 112. Raising trunnion 111 at 244 may include applying one or more safety straps 190 (see FIG. 16) around vacuum chuck 113 and rotatable chuck 150 at 246, removing one or more retaining pins 172 at 248 (e.g., pins 172 positioned near forward and aft ends 152, 154 of rotatable chuck 150, an example of which is shown in FIG. 18), rotating adjustment wheels 161, 163 at 250 (FIG. 19), and/or stopping rotation of adjustment wheels 161, 163 at 252 (such as by holding adjustment wheels 161, 163 in place, preventing further rotation, re-inserting pins 172, and/or otherwise preventing adjustment wheels 161, 163 from rotating further in either direction once a sufficient height is obtained). In some examples, adjustment wheels 160, 162 may be rotated at 254 in order to rotate rotatable chuck 150 such that the side 166 containing the vacuum chuck 113, stiffener 32, filler structure 110, and radius fillers 120 is facing downwards (e.g., rotation at 254 may be a 180 degree rotation from the position in which vacuum chuck 113 was loaded onto trunnion 111).

As best seen in FIG. 20, transfer tool 112 may be, for example, a transfer cart that may include an I-beam structure 194 having a flat upper surface 196 configured to receive an assembly 115 or sub-assembly 117 according to the present disclosure. Transfer tool 112 may include a plurality of wheels 198 that are configured to enable movement of transfer tool 112 by virtue of rolling it along a floor or other surface. Wheels 198 may be free-rolling or may engage with a track to control motion of transfer tool 112. Transfer tool 112 (e.g., a transfer cart, an industrial robot arm, or other suitable device) may be positioned near and/or underneath trunnion 111 at 256, such as by rolling transfer tool 112 into position with respect to trunnion 111. For example, transfer tool 112 may be positioned such that the flat upper surface 196 is substantially parallel with rotatable chuck 150 of trunnion 111 and at least partially underneath rotatable chuck 150. Thus, transfer tool 112 may be positioned between rotatable chuck 150 and the surface on which trunnion 111 is supported (e.g., a floor). Once positioned thusly, trunnion 111 may be lowered at 258, such as by rotating adjustment wheels 161, 163. In some examples, rotatable chuck 150 may be lowered until vacuum chuck 113 contacts transfer tool 112. Additionally or alternatively to raising and/or lowering trunnion 111, transfer tool 112 may be configured to be raised and/or lowered to at least partially meet trunnion 111.

Figure 22:
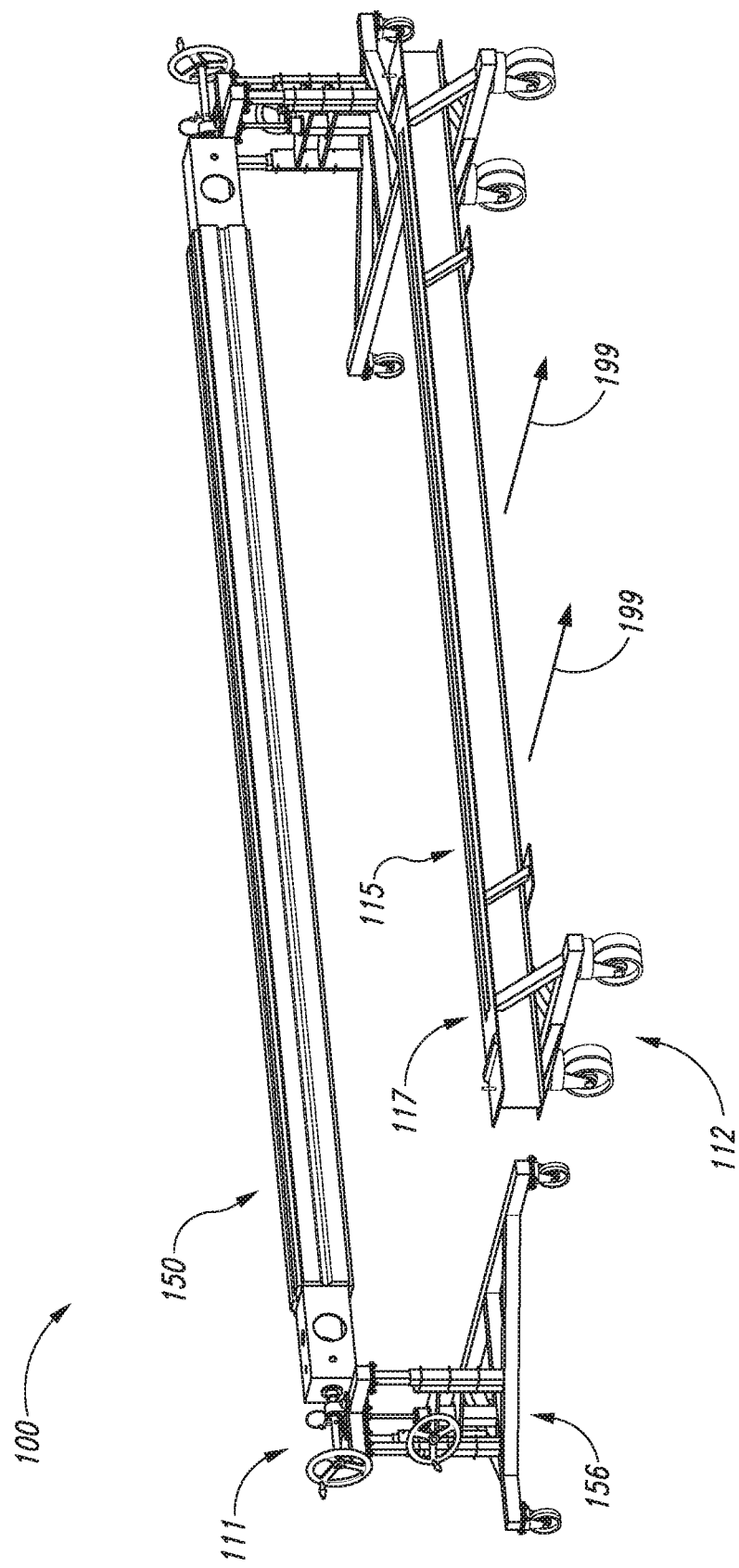
FIG. 22 is a perspective view of the transfer cart of FIG. 21 being rolled away from underneath the trunnion.
Figure 23:
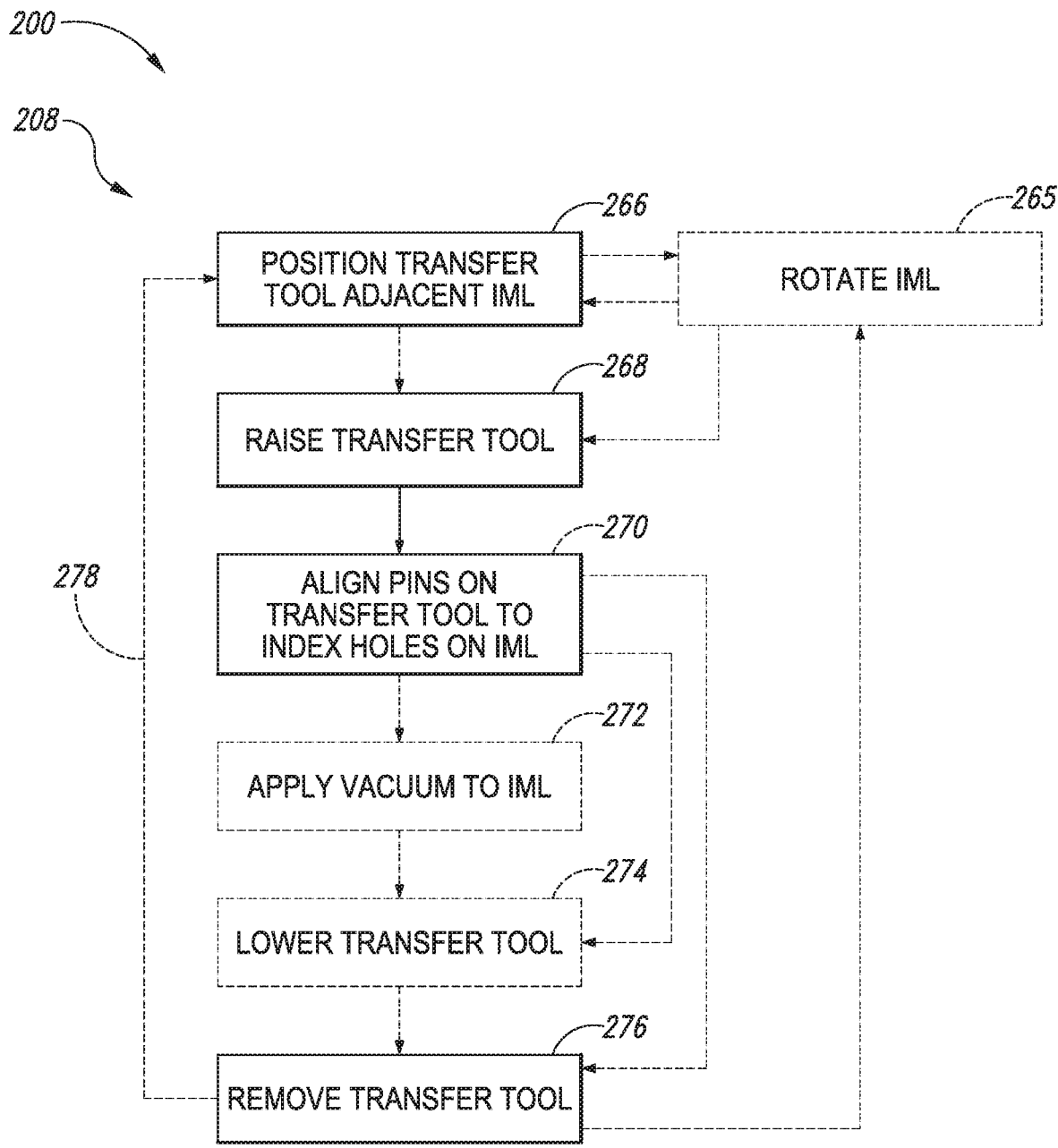
FIG. 23 is a flowchart schematically representing methods of applying a stiffener to an inner mold line layup mandrel according to the present disclosure.

After the lowering at 258, the vacuum may be released at 260 (along with any safety straps 190 present), which in turn causes assembly 115 to be released from trunnion 111 onto transfer tool 112, as shown in FIG. 21. Assembly 115 (which may include vacuum chuck 113, stiffener 32, filler structure 110, and radius fillers 120) may now rest upon flat upper surface 196 of transfer tool 112, and subsequently, rotatable chuck 150 of trunnion 111 may be raised at 262, along arrow 197, at least until rotatable chuck 150 no longer contacts assembly 115. As best seen in FIG. 22, once trunnion 111 is raised at 262, transfer tool 112 may be moved at 264, such as along arrows 199, out from under trunnion 111. In this manner, transfer tool 112 may move assembly 115 to another location (e.g., from a first position adjacent trunnion 111 to a second location, such as adjacent an inner mold line layup mandrel 106 that may be used to assemble components for a composite structure 12 according to the present disclosure).

Figure 24:
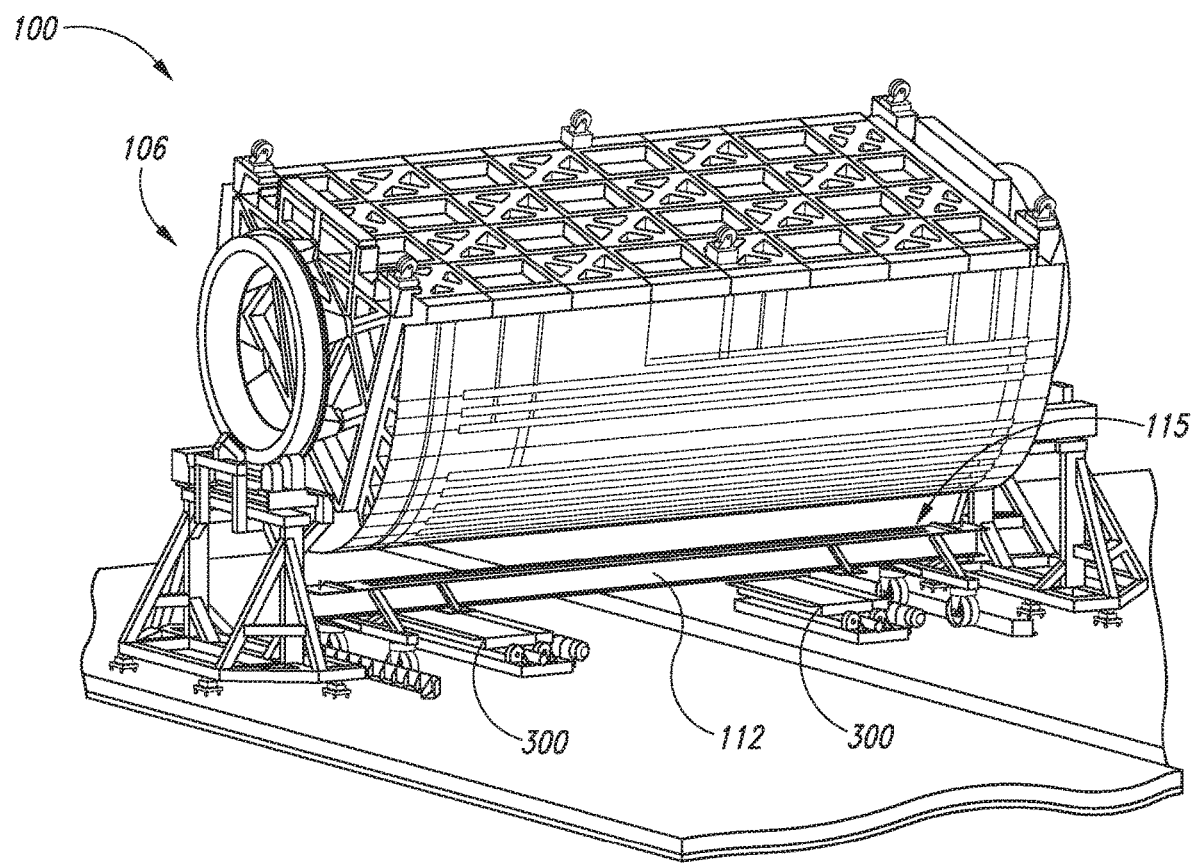
FIG. 24 is a schematic representation of transfer cart in position adjacent an inner mold line layup mandrel according to the present disclosure.

FIGS. 23-27 illustrate methods 208 and systems 100 for loading assemblies 115 onto an inner mold line layup mandrel 106. Transfer tool 112, with assembly 115 positioned on it or secured thereto (e.g., such as by resting on transfer tool 112 or being held onto transfer tool 112 via a vacuum), may be positioned adjacent an inner mold line layup mandrel 106 at 266. For example, as shown in FIG. 24, transfer tool 112 may be positioned at least partially underneath inner mold line layup mandrel 106 in some examples by rolling transfer tool 112 (e.g., transfer cart 112) into position under inner mold line layup mandrel 106. In other examples, an active vacuum surface 306 (FIG. 27) serving as transfer tool 112 may be manually positioned at 266 adjacent inner mold line layup mandrel 106. In yet other examples, an active vacuum surface 306 serving as transfer tool 112 may be positioned at 266 adjacent inner mold line layup mandrel 106 using a robotic device 308, such as a robotic arm 310. The robotic arm 310 or other robotic device 308 may be autonomous, or may be controlled by an operator.

Figure 27:
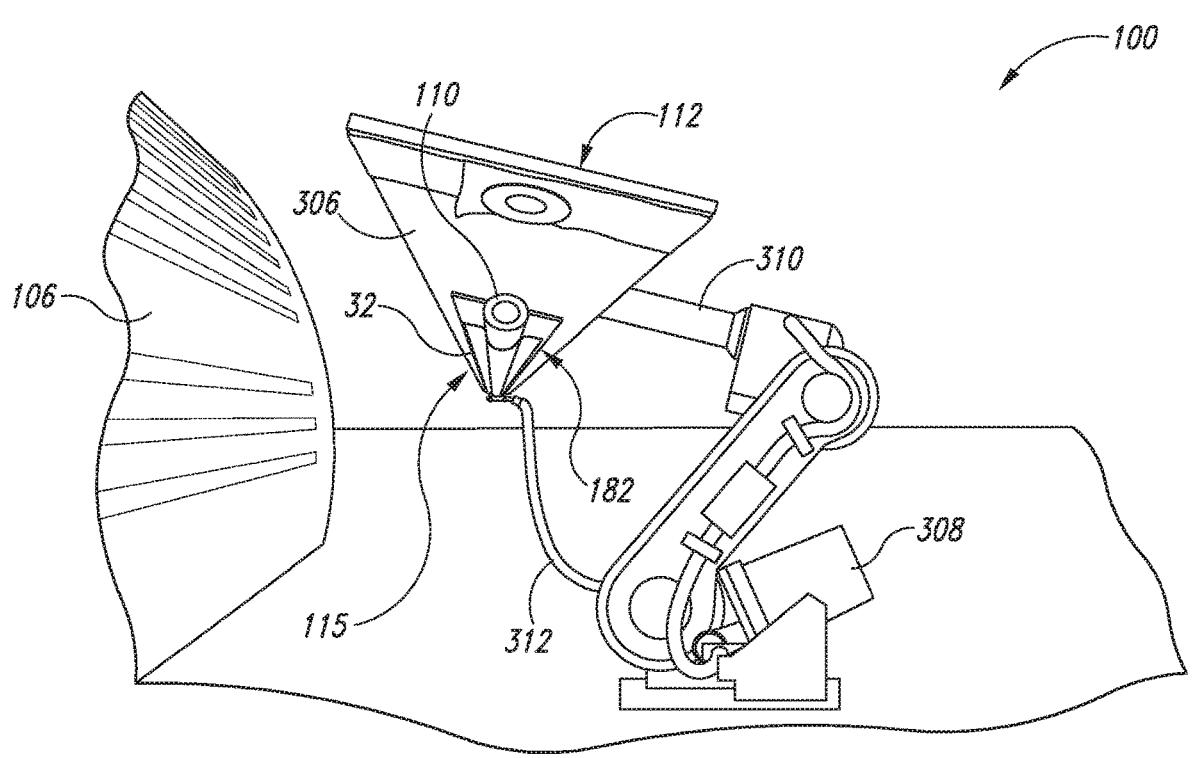
FIG. 27 is a schematic representation of an alternative transfer tool according to the present disclosure.

In some examples, transfer tool 112 may be, for example, an active vacuum surface 306 formed from fluted polycarbonate (e.g., Lexan). The active vacuum surface 306 may contain a plurality of holes to allow for a vacuum to be applied along the entire surface of stiffener assembly 117 (or assembly 115). The vacuum may be applied to active vacuum surface 306, such as through a vacuum tube 312. Stiffener assembly 117 (e.g., stiffener 32, filler structure 110, and one or more radius fillers 120) may be secured against active vacuum surface 306 such that movement of the active vacuum surface 306 (e.g., by virtue of movement of robotic arm 310) also moves stiffener assembly 117, enabling precise positioning of stiffener assembly 117 onto inner mold line layup mandrel 106. In these examples, stiffener assembly 117 may be positioned anywhere on inner mold line layup mandrel 106 (e.g., on the bottom, top, and/or sides of inner mold line layup mandrel 106). Seals 182 along longitudinal edges of stiffener 32 may ensure a proper vacuum seal for compacting stiffener assembly 117 (or assembly 115) against active vacuum surface 306, as shown in FIG. 27.

Before and/or after positioning transfer tool 112 at 266, inner mold line layup mandrel 106 may be rotated at 265 such that inner mold line layup mandrel 106 is in a desired position to receive assembly 115 (e.g., stiffener assembly 117 together with vacuum chuck 113). Transfer tool 112 may be raised (or otherwise moved towards and brought into contact with inner mold line layup mandrel 106) at 268. For example, one or more lifts 300 (FIG. 24) may be positioned under transfer cart 112, such that raising lifts 300 in turn raises transfer tool 112 towards inner mold line layup mandrel 106. In other examples, transfer tool 112 may be moved towards inner mold line layup mandrel 106 in other ways. For example, transfer tool 112 may be a transfer cart 112 configured to raise and lower (similar to trunnion 111), without the use of separate lifts. In other examples, transfer tool 112 may be manually moved towards inner mold line layup mandrel 106. In yet other examples, transfer tool 112 may be moved towards inner mold line layup mandrel 106 via a robotic device 308.

Figure 25:
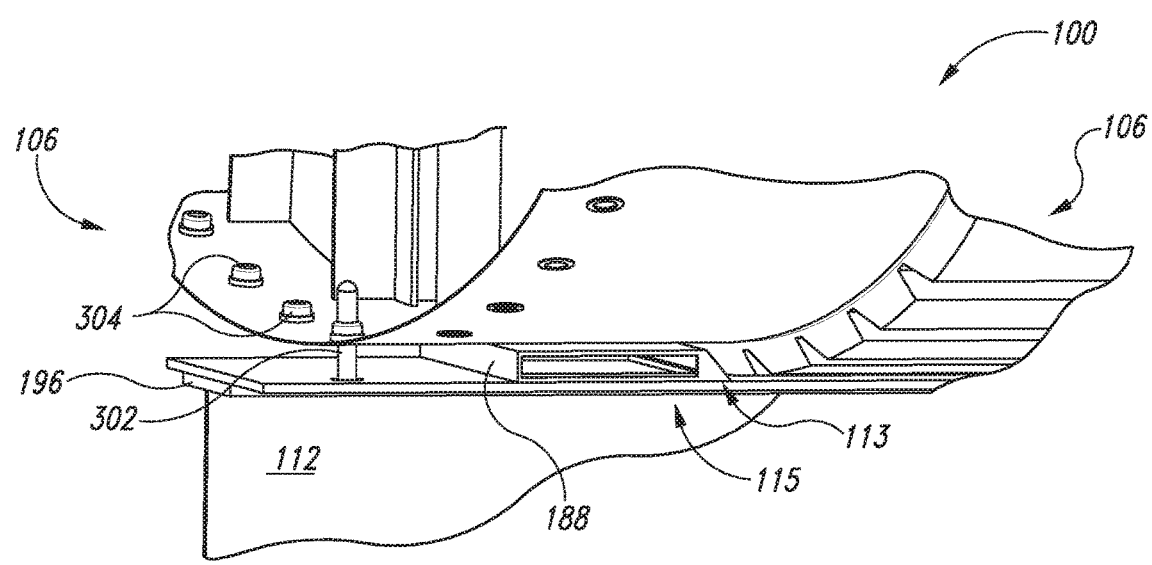
FIG. 25 is a close-up partial view of a transfer cart being indexed with an inner mold line layup mandrel according to the present disclosure.

Each of one or more index pins 302 (FIG. 25) on transfer tool 112 may be aligned with a respective index hole 304 formed in inner mold line layup mandrel 106 at 270. Thus, as transfer tool 112 and assembly 115 or stiffener assembly 117 are raised or otherwise moved into contact with inner mold line layup mandrel 106, index pins 302 may be inserted through index holes 304, and transfer tool 112 may be raised or moved until assembly 115 (or stiffener assembly 117) contacts inner mold line layup mandrel 106, as shown in FIG. 25. A vacuum may be applied via manifold 188 of vacuum chuck 113 at 272, thereby engaging assembly 115 with inner mold line layup mandrel 106 (e.g., stiffener 32 may be inserted within stiffener form 130 of inner mold line layup mandrel 106). Thus, vacuum chuck 113 may be used to compact stiffener assembly 117 to inner mold line layup mandrel 106.

Transfer tool 112 can then be lowered away or otherwise moved away from (e.g., disengaged from) inner mold line layup mandrel 106 at 274, such as by lowering lifts 300, lowering or moving transfer tool 112, and/or using robotic device 308 to move transfer tool 112 away from inner mold line layup mandrel 106. Once transfer tool 112 is disengaged from inner mold line layup mandrel 106 (e.g., lowered enough so as not to collide with inner mold line layup mandrel 106 when transfer tool 112 is moved), transfer tool 112 can be moved out from underneath (or otherwise moved away from) inner mold line layup mandrel 106 at 276. For example, transfer cart 112 may be rolled away from inner mold line layup mandrel 106 to another location in the assembly, to be used again to transfer another assembly from a trunnion 111 to inner mold line layup mandrel 106. In other examples, transfer tool 112 may be moved via robotic device 308 in order to select a subsequent assembly 115 (or stiffener assembly 117) to be transferred to inner mold line layup mandrel 106.

Figure 26:
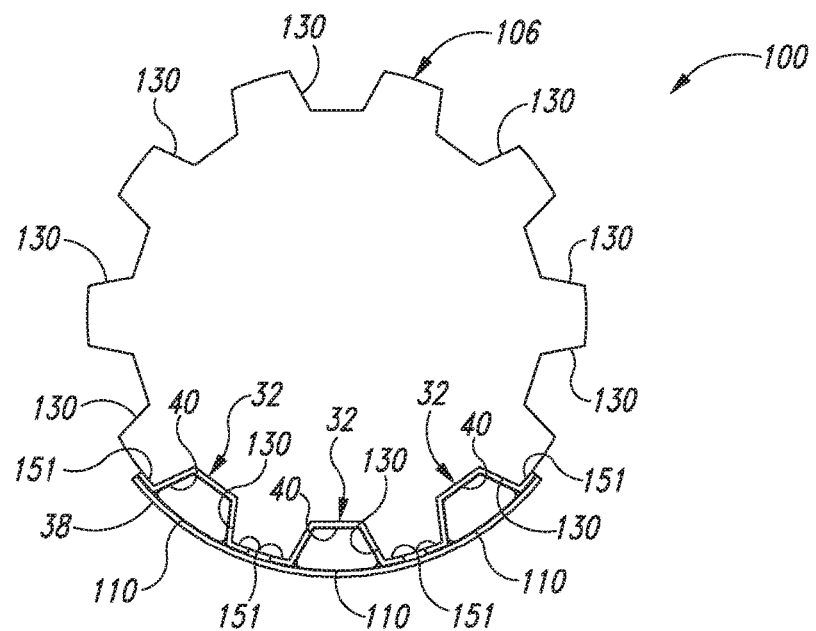
FIG. 26 is a cross-sectional schematic representation of an inner mold line layup mandrel having a plurality of stiffeners, filler structures, and skin segments there applied, according to the present disclosure.

Steps 265, 266, 268, 270, 272, 274, and/or 276 may be repeated any number of times at 278, using either the same or a different transfer tool 112 to transfer one or more subsequent assemblies 115 to inner mold line layup mandrel 106. FIG. 26 shows a schematic representation of, for example, three stiffeners 32 loaded onto inner mold line layup mandrel 106 according to disclosed methods 200, with skin segments 38 shown thereon.

While many of the above figures show just a portion of trunnion 111 (e.g., forward end 152), it is to be understood that trunnion 111 may be substantially symmetrical, such that aft end 154 of trunnion 111 may be a mirror of forward end 152, and may include components illustrated with respect to forward end 152.

Apparatus and methods disclosed herein may be employed during any one or more of the stages of the production and service method. For example, components or subassemblies corresponding to a production process may be fabricated or manufactured in a manner similar to components or subassemblies produced while the aircraft 14 is in service. Also, one or more apparatus embodiments, method embodiments, or a combination thereof may be utilized during the production stages, for example, by substantially expediting assembly of or reducing the cost of an aircraft 14. Similarly, one or more of apparatus embodiments, method embodiments, or a combination thereof may be utilized while the aircraft 14 is in service, for example and without limitation, to maintenance and service.

Illustrative, non-exclusive examples of inventive subject matter according to the present disclosure are described in the following enumerated paragraphs:

A1. A trunnion, comprising:

an elongated rotatable chuck having a plurality of sides extending between a forward end and an aft end; the elongated rotatable chuck being configured to rotate about a longitudinal axis thereof;

a plurality of stiffener trays, each stiffener tray being secured to a respective one of the plurality of sides, each stiffener tray having a respective trough formed therein, each of the troughs being configured to receive a stiffener;

a first support structure positioned adjacent the forward end;

a second support structure positioned adjacent the aft end; and a mechanism configured to raise and lower the elongated rotatable chuck with respect to the first support structure and the second support structure.

A2. The trunnion according to paragraph A1, further comprising a second mechanism configured to rotate the elongated rotatable chuck about the longitudinal axis.

A3. The trunnion according to any of paragraphs A1-A2, wherein the mechanism configured to raise and lower the elongated rotatable chuck is positioned on at least one of the first support structure and the second support structure.

A4. The trunnion according to any of paragraphs A1-A3, wherein the mechanism configured to raise and lower the elongated rotatable chuck comprises a first adjustment wheel positioned on the first support structure and a second adjustment wheel positioned on the second support structure.

A5. The trunnion according to paragraph A4, wherein the first adjustment wheel and the second adjustment wheel are configured to raise the elongated rotatable chuck when rotated in a first direction, and wherein the first adjustment wheel and the second adjustment wheel are configured to lower the elongated rotatable chuck when rotated in a second direction.

A6. The trunnion according to any of paragraphs A2-A5, wherein the second mechanism configured to rotate the elongated rotatable chuck about the longitudinal axis comprises a third adjustment wheel and a fourth adjustment wheel, the third adjustment wheel being coupled to the first support structure, and the fourth adjustment wheel being coupled to the second support structure.

A7. The trunnion according to any of paragraphs A1-A6, wherein the plurality of sides comprises a first side, a second side, a third side, and a fourth side, and wherein the plurality of stiffener trays comprises a first stiffener tray positioned on the first side, a second stiffener tray positioned on the second side, a third stiffener tray positioned on the third side, and a fourth stiffener tray positioned on the fourth side.

A8. The trunnion according to any of paragraphs A1-A7, wherein each of the respective troughs of the plurality of stiffener trays is configured to form and/or receive a different type of stiffener.

A9. The trunnion according to any of paragraphs A1-A8, further comprising one or more retaining pins configured to be inserted into the trunnion, and configured to prevent one or more of a/the first adjustment wheel, a/the second adjustment wheel, a/the third adjustment wheel, and a/the fourth adjustment wheel from rotating when the retaining pins are inserted.

A10. The trunnion according to any of paragraphs A1-A9, further comprising one or more scribe lines formed in the trunnion configured for positioning of one or more stringer segments.

A11. The trunnion according to any of paragraphs A1-A10, further comprising at least one vacuum tube coupled to at least one of the plurality of stiffener trays and configured to apply a vacuum to a stiffener assembly positioned within a respective trough of the stiffener tray.

A12. The trunnion according to any of paragraphs A1-A11, further comprising at least one index hole configured to receive a respective index pin configured to align another component with the trunnion.

B1. A system for assembling stiffened composite structures, comprising:
a trunnion according to any of paragraphs A1-A12;
an inner mold line layup mandrel;
a vacuum chuck configured to compact a stiffener assembly comprising a stiffener, a filler structure, and a radius filler onto the trunnion; and
a transfer tool configured to receive the vacuum chuck and the stiffener assembly from the trunnion and transfer the vacuum chuck and stiffener assembly to the inner mold line layup mandrel.

B2. The system according to paragraph B1, wherein the stiffener comprises a stringer.

B3. The system according to any of paragraphs B1-B2, wherein the stiffener comprises a plurality of stringer segments.

B4. The system according to any of paragraphs B1-B3, wherein the stiffener comprises a forward stringer segment, a middle stringer segment, and an aft stringer segment, wherein the forward stringer segment is positioned near the forward end of the trunnion, the aft stringer segment is positioned near the aft end of the trunnion, and wherein the middle stringer segment is positioned to join together the forward stringer section and the aft stringer section.

B5. The system according to any of paragraphs B1-B4, wherein the filler structure comprises a bladder positioned within a stiffener cavity of the stiffener.

B6. The system according to any of paragraphs B1-B5, wherein the radius filler comprises a first noodle and a second noodle, wherein the first noodle and the second noodle are positioned along a longitudinal length of the filler structure.

B7. The system according to any of paragraphs B1-B6, wherein the transfer tool comprises a transfer cart configured to receive the vacuum chuck and the stiffener assembly upon a flat upper surface, and wherein the transfer cart is configured to move the vacuum chuck and the stiffener assembly together, from a first location to a second location.

B8. The system according to any of paragraphs B1-B7, wherein the transfer tool comprises a wheeled transfer cart configured to roll to transport the vacuum chuck and the stiffener assembly together from the trunnion to the inner mold line layup mandrel.

B9. The system according to any of paragraphs B1-B8, wherein the transfer tool comprises an active vacuum surface configured to move the vacuum chuck and the stiffener assembly together from the trunnion to the inner mold line layup mandrel.

B10. The system according to any of paragraphs B1-B9, wherein the transfer tool comprises a robotic device.

B11. The system according to any of paragraphs B1-B10, further comprising:
a supply of stiffeners, wherein each stiffener defines a stiffener cavity; and
a supply of filler structures, wherein each filler structure is configured to be positioned within a respective stiffener cavity.

B12. The system according to any of paragraphs B1-B11, further comprising a supply of adhesive, the adhesive being configured to adhere at least one of the filler structure, the radius filler, and the stiffener.

B13. The system according to any of paragraphs B1-B12, further comprising a supply of skin segments, the skin segments being configured to be affixed to the inner mold line layup mandrel.

B14. The system according to any of paragraphs B1-B13, further comprising an autoclave configured to receive the stiffened composite structure and to cure the stiffened composite structure.

B15. The system according to any of paragraphs B1-B14, wherein the vacuum chuck includes at least one index pin, the at least one index pin being configured to be inserted into a respective index hole formed in the trunnion, and being configured to position the vacuum chuck with respect to the trunnion.

B16. The system according to any of paragraphs B1-B15, further comprising at least one safety strap configured to surround the vacuum chuck and the stiffener assembly in place on the trunnion.

B17. The system according to any of paragraphs B1-B16, further comprising a lift device configured to selectively raise and lower the transfer tool with respect to the inner mold line layup mandrel.

B18. The system according to any of paragraphs B1-B17, wherein the vacuum chuck includes at least one index pin, the at least one index pin being configured to be inserted into a respective inner mold line layup mandrel index hole formed in the inner mold line layup mandrel, and being configured to position the vacuum chuck with respect to the inner mold line layup mandrel.

B19. The system of any of paragraphs B1-B18, wherein the stiffener is constructed of fiber reinforced composite material, and optionally of pre-preg composite plies.

B20. The system of any of paragraphs B13-B19, wherein the skin segments are constructed of fiber reinforced composite material, and optionally of pre-preg composite plies.

B21. The system of any of paragraphs B1-B20, wherein the filler structure is constructed of rubber or rubber-like material.

B22. The system of any of paragraphs B1-B21, wherein the system is configured to construct one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

C1. A method of assembling a stiffened composite structure, comprising:
  indexing a stiffener defining a stiffener cavity to a trunnion according to any of paragraphs A1-A12;
  loading a filler structure within the stiffener cavity and a radius filler along a length of the filler structure, thereby forming a stiffener assembly;
  applying a vacuum chuck to the trunnion to compact the stiffener assembly;
  moving the vacuum chuck together with the stiffener assembly from the trunnion to a transfer tool;
  moving the transfer tool from a first position adjacent the trunnion to a second position adjacent an inner mold line layup mandrel; and
  loading the vacuum chuck together with the stiffener assembly onto the inner mold line layup mandrel.

C2. The method according to paragraph C1, wherein the stiffener comprises a stringer.

C3. The method according to any of paragraphs C1-C2, wherein the stiffener comprises a plurality of stringer segments.

C4. The method according to any of paragraphs C1-C3, further comprising splicing a plurality of stringer segments together to form the stiffener.

C5. The method according to any of paragraphs C1-C4, further comprising rotating the elongated rotatable chuck of the trunnion prior to the moving the vacuum chuck together with the stiffener assembly from the trunnion to the transfer tool.

C6. The method according to any of paragraphs C1-C5, wherein the moving the vacuum chuck together with the stiffener assembly from the trunnion to the transfer tool comprises releasing a vacuum.

C7. The method according to any of paragraphs C1-C6, further comprising rotating the inner mold line layup mandrel.

C8. The method according to any of paragraphs C1-C7, further comprising:
  compacting the stiffener assembly to the inner mold line layup mandrel using the vacuum chuck; and
  removing the vacuum chuck from the inner mold line layup mandrel after the compacting the stiffener assembly to the inner mold line layup mandrel.

C9. The method according to any of paragraphs C1-C8, further comprising affixing one or more skin segments to the inner mold line layup mandrel.

C10. The method according to any of paragraphs C1-C9, further comprising curing the stiffener assembly along with one or more skin segments to form a stiffened composite structure.

C11. The method according to any of paragraphs C1-C10, further comprising assembling a plurality of stiffened composite structures together.

C12. The method according to any of paragraphs C1-C11, wherein the indexing comprises one or more of transferring a stiffener segment to a stiffener tray on the trunnion, positioning the stiffener segment with respect to the trunnion, splicing a plurality of stiffener segments together, applying an adhesive, installing a/the filler structure, loading a/the radius filler, rotating the elongated rotatable chuck of the trunnion, and installing a retaining pin in the trunnion to prevent further rotation of the elongated rotatable chuck.

C13. The method according to any of paragraphs C1-C12, wherein the applying the vacuum chuck comprises one or more of aligning an alignment pin on the vacuum chuck with an alignment hole formed in the trunnion, strapping the vacuum chuck and the stiffener assembly onto the trunnion, and applying a vacuum via a manifold of the vacuum chuck, thereby compacting the vacuum chuck and the stiffener assembly together on the trunnion.

C14. The method according to any of paragraphs C1-C13, wherein the moving the vacuum chuck together with the stiffener assembly from the trunnion to the transfer tool comprises one or more of raising the trunnion to a height greater than that of the transfer tool, rotating the elongated rotatable chuck of the trunnion, applying a safety strap, removing a retaining pin from the trunnion, rotating one or more adjustment wheels in order to rotate the elongated rotatable chuck, preventing further rotation of the elongated rotatable chuck once a desired position is obtained, positioning the transfer tool adjacent the trunnion, and moving the transfer tool away from the trunnion once the vacuum chuck and stiffener assembly are moved from the trunnion to the transfer tool.

C15. The method according to any of paragraphs C1-C14, wherein the transfer tool is a transfer cart.

C16. The method according to any of paragraphs C1-C15, wherein the transfer tool comprises an active vacuum surface.

C17. The method according to any of paragraphs C1-C16, wherein the transfer tool comprises a robotic device configured to position the transfer tool with respect to the trunnion and/or the inner mold line layup mandrel.

C18. The method according to any of paragraphs C1-C17, further comprising positioning the transfer tool underneath the trunnion.

C19. The method according to any of paragraphs C1-C18, further comprising lowering the elongated rotatable chuck towards the transfer tool.

C20. The method according to any of paragraphs C1-C19, further comprising releasing a vacuum compacting the vacuum chuck and the stiffener assembly to the trunnion, thereby releasing the vacuum chuck together with the stiffener assembly onto the transfer tool.

C21. The method according to any of paragraphs C1-C20, further comprising raising the elongated rotatable chuck away from the transfer tool to enable removal of the transfer tool from underneath the trunnion.

C22. The method according to any of paragraphs C1-C21, wherein the moving the transfer tool from the first position adjacent the trunnion to the second position adjacent the inner mold line layup mandrel comprises rolling the transfer tool from the first position to the second position.

C23. The method according to any of paragraphs C1-C22, wherein the loading the vacuum chuck together with the stiffener assembly onto the inner mold line layup mandrel comprises one or more of raising the transfer tool towards the inner mold line layup mandrel, aligning an index pin on the transfer tool with an index hole formed in the inner mold line layup mandrel, applying a vacuum to the inner mold line layup mandrel, compacting the stiffener assembly to the inner mold line layup mandrel, lowering the transfer tool away from the inner mold line layup mandrel, and removing the transfer tool from the proximity of the inner mold line layup mandrel.

C24. The method according to any of paragraphs C1-C23, further comprising:
  providing a supply of stiffeners, wherein each stiffener defines a stiffener cavity; and
  providing a supply of filler structures.

C25. The method according to any of paragraphs C1-C24, further comprising repeating the indexing, the forming the stiffener assembly, the applying the vacuum chuck to the trunnion to compact the stiffener assembly, the moving the vacuum chuck together with the stiffener assembly from the trunnion to the transfer tool, the moving the transfer tool from the first position adjacent the trunnion to the second position adjacent the inner mold line layup mandrel, and the loading the vacuum chuck together with the stiffener assembly onto the inner mold line layup mandrel to load a plurality of stiffener assemblies onto the inner mold line layup mandrel.

C26. The method according to paragraph C25, further comprising, following the repeating, affixing a skin segment over the plurality of stiffener assemblies loaded on the inner mold line layup mandrel to form at least a portion of the stiffened composite structure.

C27. The method of any of paragraphs C1-C26, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

C28. The method of any of paragraphs C1-C27, wherein the filler structure is constructed of rubber.

C29. The method of any of paragraphs C1-C28, wherein the stiffener is constructed of fiber reinforced composite material, and optionally of pre-preg composite plies.

C30. The method of any of paragraphs C26-C29, wherein the skin segment is constructed of fiber reinforced composite material, and optionally of pre-preg composite plies.

C31. The method of any of paragraphs C1-C30, wherein the method utilizes the system of any of paragraphs B1-B22.

D1. A stiffened composite structure constructed using the method of any of paragraphs C1-C31, optionally wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of assembling a stiffened composite structure, comprising:
   indexing a stiffener defining a stiffener cavity to a trunnion, the trunnion comprising:
      an elongated rotatable chuck having a plurality of sides extending between a forward end and an aft end, the elongated rotatable chuck being configured to rotate about a longitudinal axis thereof;
      a plurality of stiffener trays, each respective stiffener tray being secured to a respective one of the plurality of sides, each respective stiffener tray having a respective trough formed therein, each of the respective troughs being configured to receive a respective stiffener;
      a first support structure positioned adjacent the forward end of the elongated rotatable chuck;
      a second support structure positioned adjacent the aft end of the elongated rotatable chuck; and
      a mechanism configured to raise and lower the elongated rotatable chuck with respect to the first support structure and the second support structure;
   loading a filler structure within the stiffener cavity and a radius filler along a length of the filler structure, thereby forming a stiffener assembly positioned within a respective trough of the trunnion;
   applying a vacuum chuck to the trunnion to compact the stiffener assembly within a respective trough of a respective stiffener tray of the trunnion;
   moving the vacuum chuck together with the stiffener assembly from the trunnion to a transfer tool;
   moving the transfer tool from a first position adjacent the trunnion to a second position adjacent an inner mold line layup mandrel; and
   loading the vacuum chuck together with the stiffener assembly onto the inner mold line layup mandrel.

2. The method according to claim 1, further comprising rotating the elongated rotatable chuck of the trunnion prior to the moving the vacuum chuck together with the stiffener assembly from the trunnion to the transfer tool.

3. The method according to claim 1, wherein the moving the vacuum chuck together with the stiffener assembly from the trunnion to the transfer tool comprises releasing a vacuum.

4. The method according to claim 1, further comprising compacting the stiffener assembly onto the inner mold line layup mandrel using the vacuum chuck.

5. The method according to claim 4, further comprising:
rotating the inner mold line layup mandrel;
removing the vacuum chuck from the inner mold line layup mandrel after the compacting the stiffener assembly onto the inner mold line layup mandrel; and
affixing one or more skin segments to the inner mold line layup mandrel.

6. The method according to claim 1, further comprising curing the stiffener assembly along with one or more skin segments to form a stiffened composite structure, wherein the stiffened composite structure includes one of a barrel section of an aircraft fuselage, a wing section of an aircraft, a wing of an aircraft, a stabilizer section of an aircraft, a stabilizer of an aircraft, and a structural section of an aircraft.

7. The method according to claim 1, wherein the indexing comprises:
transferring a stiffener segment to one of the stiffener trays on the trunnion,
applying a compactor to the stiffener and the stiffener tray;
positioning the stiffener segment with respect to the trunnion; and
removing the compactor.

8. The method according to claim 1, wherein the indexing comprises splicing a plurality of stiffener segments together.

9. The method according to claim 1, wherein the applying the vacuum chuck comprises:
aligning an alignment pin on the vacuum chuck with an alignment hole formed in the trunnion; and
applying a vacuum via a manifold of the vacuum chuck, thereby compacting the vacuum chuck and the stiffener assembly together on the trunnion.

10. The method according to claim 1, wherein the loading the vacuum chuck together with the stiffener assembly onto the inner mold line layup mandrel comprises:
raising the transfer tool towards the inner mold line layup mandrel;
aligning an index pin on the transfer tool with an index hole formed in the inner mold line layup mandrel;
applying a vacuum to the inner mold line layup mandrel to compact the stiffener assembly to the inner mold line layup mandrel; and
removing the transfer tool from a proximity of the inner mold line layup mandrel.

11. The method according to claim 1, wherein the stiffener comprises a stringer for an aircraft.

12. The method according to claim 1, wherein the moving the vacuum chuck together with the stiffener assembly from the trunnion to the transfer tool comprises:
positioning the transfer tool underneath the trunnion;
lowering the elongated rotatable chuck towards the transfer tool; and
releasing a vacuum compacting the vacuum chuck and the stiffener assembly to the trunnion, thereby releasing the vacuum chuck together with the stiffener assembly onto the transfer tool.

13. The method according to claim 12, further comprising raising the elongated rotatable chuck away from the transfer tool to enable removal of the transfer tool from underneath the trunnion, wherein the raising the elongated rotatable chuck is performed before the moving the transfer tool from the first position adjacent the trunnion to the second position adjacent the inner mold line layup mandrel.

14. The method according to claim 1, further comprising repeating the indexing, the forming the stiffener assembly, the applying the vacuum chuck to the trunnion to compact the stiffener assembly, the moving the vacuum chuck together with the stiffener assembly from the trunnion to the transfer tool, the moving the transfer tool from the first position adjacent the trunnion to the second position adjacent the inner mold line layup mandrel, and the loading the vacuum chuck together with the stiffener assembly onto the inner mold line layup mandrel to load a plurality of stiffener assemblies onto the inner mold line layup mandrel.

15. The method according to claim 14, further comprising, following the repeating, affixing a skin segment over the plurality of stiffener assemblies loaded on the inner mold line layup mandrel to form at least a portion of the stiffened composite structure.

16. The method according to claim 1, wherein the transfer tool comprises an active vacuum surface, and wherein the moving the vacuum chuck together with the stiffener assembly from the trunnion to the transfer tool comprises so moving the vacuum chuck and the stiffener assembly via a robotic device.

17. The method according to claim 1, further comprising operatively coupling a vacuum tube to the trunnion such that the vacuum tube is configured to apply a vacuum to at least one of the stiffener trays of the trunnion, thereby applying a vacuum to the respective stiffener assembly within the trough of the stiffener tray.

18. A method of assembling a stiffened composite structure, comprising:
positioning a stiffener defining a stiffener cavity within a trough of an elongated rotatable chuck;
loading a filler structure within the stiffener cavity, thereby forming a first stiffener assembly within the trough;
compacting the first stiffener assembly within the trough of the elongated rotatable chuck using a vacuum chuck and an associated vacuum manifold;
moving the vacuum chuck together with the first stiffener assembly from the elongated rotatable chuck to a transfer tool;
moving the transfer tool from a first position adjacent the elongated rotatable chuck, to a second position adjacent an inner mold line layup mandrel;
loading the vacuum chuck together with the first stiffener assembly onto the inner mold line layup mandrel; and
compacting the first stiffener assembly onto the inner mold line layup mandrel using the vacuum chuck.

19. The method according to claim 18, further comprising:
rotating the inner mold line layup mandrel;
moving the transfer tool from the second position to the first position;
moving a second stiffener assembly from the elongated rotatable chuck to the transfer tool;
moving the transfer tool back to the second position;
loading the second stiffener assembly from the transfer tool onto the inner mold line layup mandrel in a different location from the first stiffener assembly; and
compacting the second stiffener assembly onto the inner mold line layup mandrel.

20. The method according to claim 19, further comprising curing the first stiffener assembly and the second stiffener assembly to form the stiffened composite structure, wherein the stiffened composite structure comprises a section of an aircraft fuselage.

* * * * *